United States Patent [19]

Hayashida

[11] Patent Number: 5,517,097
[45] Date of Patent: May 14, 1996

[54] CONTROLLING APPARATUS AND CONTROLLING METHOD IN MACHINE TOOL

[75] Inventor: Takahiro Hayashida, Nagoya, Japan

[73] Assignee: Mitsubishi Denki Kabushiki Kaisha, Tokyo, Japan

[21] Appl. No.: 300,187

[22] Filed: Sep. 2, 1994

[30] Foreign Application Priority Data

Sep. 2, 1993 [JP] Japan .................................. 5-218669

[51] Int. Cl.$^6$ ........................................................ G05D 3/00
[52] U.S. Cl. ........................ 318/568.22; 318/571; 318/77; 318/616; 318/632; 364/164
[58] Field of Search ........................................ 318/560–562, 318/568.2, 568.21, 568.22, 569–574, 77–81, 85, 610, 615–621, 625, 632; 364/174.28–174.35, 157, 162, 164–166

[56] References Cited

U.S. PATENT DOCUMENTS

| | | | |
|---|---|---|---|
| 4,912,385 | 3/1990 | Kawamura et al. | 318/571 X |
| 4,985,841 | 1/1991 | Iwagaya | 364/474.33 |
| 4,992,712 | 2/1991 | Fujimoto et al. | 318/571 X |
| 5,010,286 | 4/1991 | Nakamura et al. | 318/571 |
| 5,107,193 | 4/1992 | Iwashita | 318/610 X |
| 5,184,053 | 2/1993 | Maruo et al. | 318/571 |
| 5,194,790 | 3/1993 | Niimi | 318/573 X |
| 5,223,778 | 6/1993 | Svarovsky et al. | 318/610 |
| 5,233,535 | 8/1993 | Ito et al. | 318/571 X |
| 5,237,251 | 8/1993 | Kono et al. | 318/571 |
| 5,307,549 | 5/1994 | Tsutsumi et al. | 318/571 X |
| 5,339,016 | 8/1994 | Thoen | 318/610 |

FOREIGN PATENT DOCUMENTS

| | | |
|---|---|---|
| 0429768 | 6/1991 | European Pat. Off. .. |
| 0583478 | 2/1994 | European Pat. Off. .. |
| 59-191606 | 10/1984 | Japan . |
| 63-89904 | 4/1988 | Japan . |
| 116285 | 1/1989 | Japan . |
| 64-16285 | 1/1989 | Japan . |
| 64-27808 | 1/1989 | Japan . |

Primary Examiner—Brian Sircus
Attorney, Agent, or Firm—Sughrue, Mion, Zinn, Macpeak & Seas

[57] ABSTRACT

A machine tool controlling apparatus and method wherein the current operation is in a normal operation mode or in a positionly synchronized operation mode in which a spindle and a subordinate axis are positionly synchronized. If it is determined that the current operation is in the positionly synchronized operation mode, transfer function models for the spindle and the subordinate axis are extrapolated into a position instruction issued to the subordinate axis.

30 Claims, 16 Drawing Sheets

CONTROLLING APPARATUS AND CONTROLLING METHOD IN MACHINE TOOL

FIELD OF THE INVENTION

This invention relates to a controlling apparatus as well as a controlling method for a machine tool which controls speed or position of a spindle and a subordinate axis by issuing a speed instruction or a position instruction to a controlling apparatus in the machine tool, having a position synchronizing function for a spindle and a subordinate axis.

BACKGROUND OF THE INVENTION

To simplify the description, a synchronous tapping function, which is a representative function for position synchronization between a spindle and a subordinate axis, is taken up as an example in the following description. FIGS. 14, 15 and 16 show a spindle driving apparatus and a Z-axis servo driving apparatus, and in FIGS. 14, 15 and 16 an alternately long and short dashed line indicates a digital value provided by software.

In FIG. 14, reference numeral 1 indicates a numerical value controlling apparatus (called an controlling apparatus hereinafter) which issues a speed instruction ωrs*, and position instructions θrs* and θrz*. Reference numerals 2, 2a indicate a spindle driving apparatus and a Z-axis servo driving apparatus (called Z-axis driving apparatus hereinafter) each connected to the controlling apparatus 1 respectively. Reference numerals 3, 3a indicate a spindle motor connected to the spindle driving apparatus 2 and a Z-axis motor connected to the Z-axis driving apparatus 2a respectively. The reference numerals 4, 4a indicate a spindle position detector which is directly connected to a revolving shaft of the spindle motor 3 and generates, for instance, output of 256 waves per rotation, and a Z-axis position detector which is directly connected to a revolving shaft of the Z-axis motor 3a and generates, for instance, 2500 pulses per rotation respectively. Reference numerals 17, 17a indicate a spindle position detecting circuit which receives an output signal from the spindle position detector 4 and generates a position detection signal θrs and a Z-axis position detecting circuit which receives an output signal from the Z-axis position detector 4a and generates a position detection signal θrz. Reference numeral 5 indicates a spindle in the machine tool with the revolving shaft driven by the spindle motor 3 and the vertical shaft (Z-axis) controlled by the Z-axis motor 3a. Reference numeral 5a indicates a Z-axis table which slides the spindle 5 in the vertical direction. Reference numerals 6, 6a indicate a spindle gear which connect the spindle motor 3 to the spindle 5 and a Z-axis gear which connects the Z-axis motor 3a to the Z-axis table 5a. Reference numeral 7 indicates a tool (tapper) for tapping, and reference numeral 8 indicates a differentiator which receives and differentiates position detection signal θrs and position detection signal θrz, and issues speed detection signals ωrs and ωrz.

In FIG. 15, reference numerals 10, 10a indicate comparators which compare position instructions θrs*, θrz* to position detecting signal θrs, θrz and output position deviation signal Δθrs, Δθrz. Reference numerals 11, 11a indicate position loop gain circuits which are connected to the comparators 10, 10a respectively and amplify the position deviation signals Δθrs and Δθrz according to position loop gains $K_{PS}$, $K_{PZ}$ respectively. Reference numeral 12 indicates a mode select switch having a contact A to which the speed instruction ωrs* is entered as well as a contact B to which output from the position loop gain circuit 11 is entered and, selecting contact A in a speed control mode for controlling revolving speed of the spindle 5, and selecting contact B in a position control mode for controlling rotational position of the spindle 5. Reference numeral 13 indicates a comparator which compares output ωrs* to speed detection signal ωrs and provides a speed deviation signal Δωrs as output. Reference numeral 13a indicates a comparator which compares output ωrz* from position loop gain circuit 11a to the speed detection signal ωrz and provides speed deviation signal ≠ωrz. Reference numerals 14, 14a indicate speed loop gain circuits which amplify the speed deviation signals Δωrs, Δωrz according to speed loop gains $K_{vs}$, $K_{vz}$ respectively and provide current instructions Is'*, Iz'*. Reference numerals 15, 15a indicate current limiter circuits which limit output Is'*, Iz'* from the speed loop gain circuits 14, 14a respectively to a current value corresponding to the output characteristics of a motor and provide current instructions Is*, Iz* as output respectively. Reference numerals 16, 16a indicate power convertor circuits which supply outputs Is*, Iz* from the power limiter circuits 15, 15a to motors 3, 3a respectively.

In the description below, the operation of the spindle driving apparatus 2 and the Z-axis driving apparatus 2a of a machine tool having a synchronous operation function based on the conventional art is divided into (1) an operation in normal spindle operation mode, and (2) an operation in synchronous tap running mode.

(1) Normal spindle operation mode

In the case of normal spindle operation mode in which synchronous tapping is not carried out, mode select switch 12 in the spindle driving apparatus 2 is set to contact A. The speed instruction ωrs* corresponding to a target number of rotations for the spindle 5 is issued from the controlling apparatus 1. Accordingly, the spindle driving apparatus 2 provide controls to cause a speed (ωrs) of the spindle motor 3 to follow the speed instruction ωrs*. Namely, the speed instruction ωrs* and the speed detection signal ωrs are compared by the comparator 13, the speed deviation signal Δωrs is issued from the comparator 13, and the speed deviation signal Δωrs is amplified and provided as the current instruction Is'* in the speed loop gain circuit 14 and then converted to power for driving the spindle motor 3 in a power convertor circuit 16. With this operation, the spindle motor 3 is controlled so that it follows the speed instruction ωrs*.

Also in the normal spindle operation mode, the Z-axis driving apparatus 2a works independently from the spindle driving apparatus 2. In this case, the position instruction θrz* and the position detection signal θrz are compared by the comparator 10a. The position deviation signal Δθrz is issued from the comparator 10a and amplified in the position loop gain circuit 11a and then entered into the comparator 13a. The subsequent operations are the same as those of the spindle driving apparatus 2 in the normal spindle operation mode as described above, while the Z-axis table 5a is controlled so that it follows the position instruction θrz* via the Z-axis motor 3a.

(2) synchronous tapping operation mode

In the case of a synchronous tapping operation mode, a rotational position of a spindle and a position of a Z-axis are synchronized. Specifically, an instruction given to the spindle driving apparatus 2 is switched to the position instruction θrs* by the controlling apparatus 1. The spindle driving apparatus 2 detects this condition and switches the mode select switch 12 to contact B. The position instruction θrs* and the position detection signal. θrs are compared by the comparator 10, the position deviation signal Δθrs is issued from the comparator 10, and the position deviation signal Δθrs is amplified by the position loop gain circuit 11 and entered into the comparator 13 as a speed instruction. The subsequent operations are the same as those in the normal spindle operation mode as described above. Consequently, and the spindle 5 is controlled via the spindle motor 3 so that it follows the position instruction θrs*.

Also in the case of a synchronous tapping operation mode, the Z-axis driving apparatus 2a receives a Z-axis position instruction θrz*, which is in synchronous relation with the position instruction θrs* to the spindle driving apparatus 2 described above, from the instruction apparatus 1. Also, the Z-axis table 5a is controlled via the Z-axis motor 3a that it follows the position instruction θrz*.

FIG. 16 is a block diagram showing configuration modified from that shown in FIG. 15. In FIG. 16, a torque constant circuit 18, 18a multiplies the output from the speed loop gain circuit 14, 14a with torque constants $K_{tS}$, $K_{tZ}$ and issues the products as torque instructions $T_{LS}^*$, $T_{LZ}^*$ respectively. Also, a comparator 19, 19a compares the torque instructions $T_{LS}^*$, $T_{LZ}^*$ to external disturbance torque $T_{LS}$, $T_{LZ}$, respectively. Finally, a division circuit 20, 20a carries out subtraction with motor inertia $J_S$, $J_Z$, and an integrator 21 executes integration.

In the synchronous tapping operation as described above, a response to a speed loop in spindle control system is generally lower than that the Z-axis control system, for the reasons (a) to (c) as described below.

(a) Firstly, the larger a value of a motor (torque/inertia) is, the higher a response to a speed loop is, but the aforesaid value in the Z-axis motor using a synchronous motor therein is substantially larger as compared to that in the spindle motor using a conductive motor therein, and a difference in response exists between each motor unit. Generally in a motor unit, response of the Z-axis is about 5 to 10 times higher than that of the spindle.

(b) Secondly, a ratio of inertia of a motor itself vs load inertia at the side of a machine driven by the motor can be suppressed to below about 2 times in a Z-axis, while that in a spindle is in a range from 1 to 5 times (L gear: 1 to 2 times, M gear: 2 to 3 times, H gear: 4 to 5 times), and a speed loop gain in a spindle, especially an M gear and a H gear, becomes relatively lower.

(c) Thirdly, even if the load inertia described above becomes larger, the responsibility does not drop by increasing the speed loop gain in proportion to increase of the load inertia described above. However, as a larger backlash generally exists in a spindle gear, if a gain is raised too much, vibration is generated due to instability. For this reason, even if load inertia becomes larger, the speed loop gain can not be raised.

This difference in speed loop response between a spindle control system and a Z-axis control system may sometimes cause a position error between the two in operations for acceleration or deceleration or in fluctuation due to load external disturbance, each of which is a transitional state in a synchronous tapping operation, which in turns give influence over a thread cutting in the synchronous tapping operation. In the conventional art, as described above, a position differences of the two becomes larger in an H gear. This causes a problem concerning a thread cutting precision of a tap, so that synchronous tapping is performed only in an L gear and an M gear, in each of which has a relatively small load inertia.

Technological documents relating to the present invention include the Japanese Patent Laid Open Publication No. SHO 59-191606 disclosing "a synchronous operation system", the Japanese Patent Laid Open Publication No. SHO 64-16285 (HEI 1-16285) disclosing "an invertor controlling apparatus", the Japanese Patent Laid Open Publication No. SHO 64-27808 (HEI 1-27808) disclosing "a numerical controlling apparatus", and the Japanese Patent Laid Open No. SHO 63-89904 disclosing "a numerical controlling apparatus".

In an instruction apparatus for a machine tool having a synchronous tapping function based on the conventional art as described above, a similar position instruction is issued to a Z-axis controlling apparatus in both the normal spindle operation mode and the synchronous tapping operation mode. In the normal spindle operation mode in which position synchronization between a spindle and a Z-axis is not necessary, a difference in speed response between two does not cause any specific problem, but in synchronous tapping operation mode in which position synchronization is required as described above, a difference in speed response between the two gives an influence over the thread cutting precision of a tap.

In order to raise the precision, generally a position loop gain for the two is equalized to make the position orbit for the two identical, as a minimum requirement. In this case, however, a relative position error between the two can occur due to a difference in speed response. Also, since the position loop gain for the Z-axis must be set to a value that is a little lower than the actual spindle side, the Z-axis position becomes vulnerable to fluctuation due to external disturbance in proportion to the difference. Furthermore, if the tapping time constant is made larger to reduce relative position error between the spindle and the Z-axis position by reducing the transmission ratio for acceleration and deceleration, then the cycle time becomes longer, which degrades productivity.

Also in the conventional art, as described above, synchronous taping is not executed with an H gear, but with an L gear and an M gear for improving precision, and for minimizing a difference in speed response between a spindle and a Z-axis. Nonetheless, a response delay to the Z-axis exists. Furthermore, as the maximum speed of the spindle becomes lower when synchronous tapping is executed with an L gear and an M gear as compared to that when executed with an H gear, a high speed tapping cycle can not be achieved which also reduces productivity.

The aforesaid problems are concretely described hereinafter with reference to FIG. 13. FIG. 13, waveform (a) shows speed of a spindle and the Z-axis versus time. As shown in FIG. 13(a), the speed line of spindle does not coincide with the speed line of Z-axis, because the spindle is a rotating axis and the Z-axis is a linear axis. Accordingly, they are significant differences in relative position and a wide range. Namely, in FIG. 13, waveform (c), when executing synchronous tapping, a speed loop response in a spindle control system is generally lower as compared to that in a Z-axis control system. For instance, because the load AD 2 is large and a motor inertia is larger. Accordingly, even if a position loop gain is identical, a difference in the speed loop response or a position loop gain in the Z-axis is set to a somewhat lower value for the spindle. Accordingly, a large relative position difference may occur when, for instance, the speed rapidly changes (t4, t6, t7, t9, t10 etc.) or when a load due to external disturbance rapidly changes (t5, tS, t11, etc.).

SUMMARY OF THE INVENTION

It is an object of the invention to provide a controlling apparatus of and a controlling method for machine tool which enable reduction of a relative position difference between a Z-axis and a spindle in synchronous tapping operation to improve the tapping precision, shortening a cycle time in tapping, and improvement in productivity.

other objects and features of this invention will become understood from the following description with reference to the accompanying drawings.

DESCRIPTION OF THE EMBODIMENTS

Figure 1:
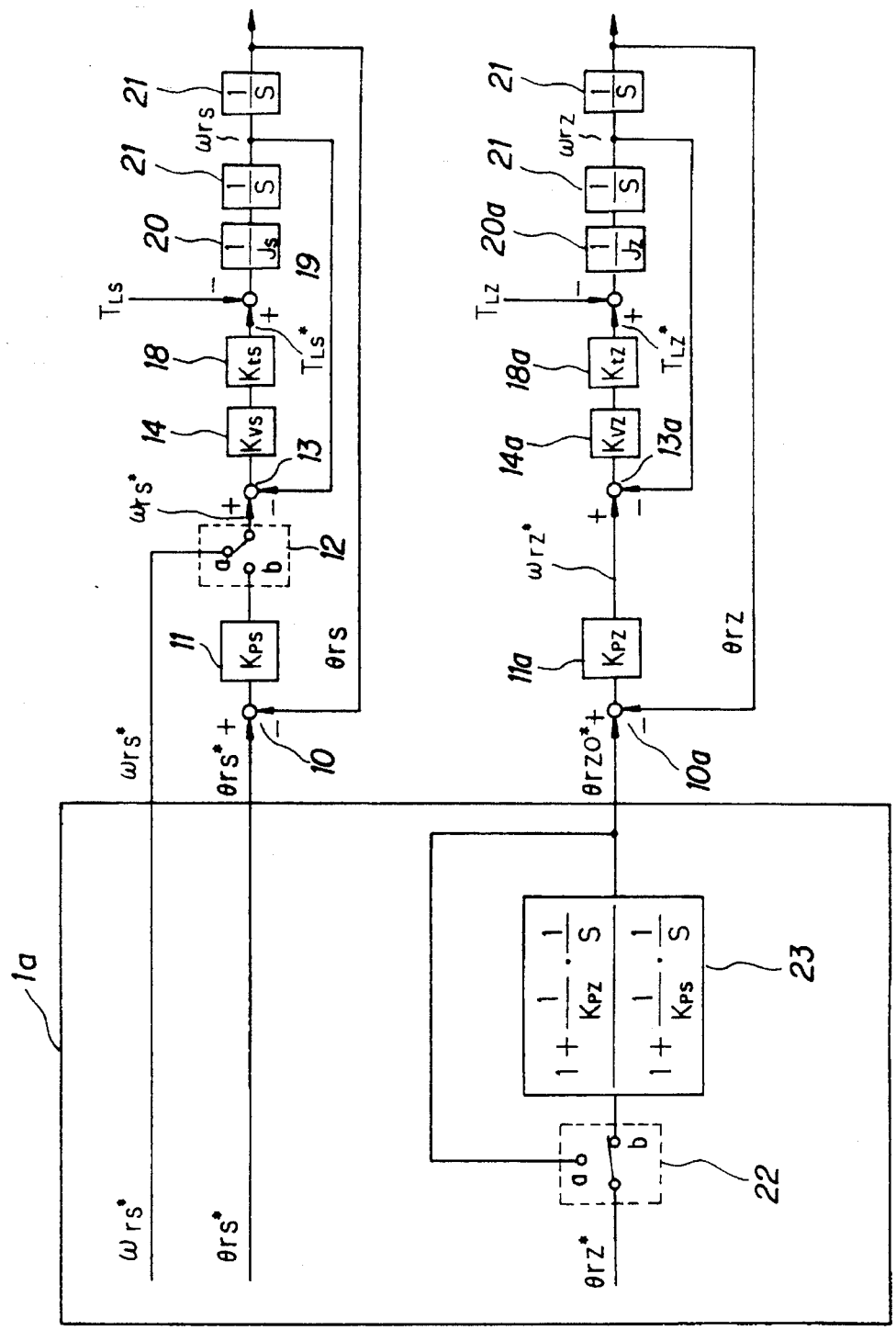
FIG. 1 is a block diagram illustrating a general configuration of a machine tool controlling apparatus according to the present invention.

Description is made hereinafter for embodiments of a machine tool controlling apparatus according to the present invention with reference to the related drawings. Elements similar to those in conventional types of apparatus are indicated by the same reference numbers, and a description thereby is omitted herein. FIG. 1 is a control block diagram illustrating a general configuration of a machine tool controlling apparatus in a first embodiment of the present invention. In this figure, the reference numeral 1a indicates controlling apparatus, the reference numeral 22 indicates a mode select switch which switches under the same conditions as those for a mode select switch 12, and the reference numeral 23 is a filter means having a transfer function for a spindle in the denominator and a transfer function for a subordinate axis in the numerator.

Now description is made for operations of the machine tool controlling apparatus described above.

(1) Normal spindle operation mode

When a spindle is run in the normal operation mode in which synchronous tapping is not executed, the mode select switches 12 and 22 are set to the side "a", and then the operation is the same as that based on the conventional art.

(2) Synchronous tapping operation mode

When synchronous tapping is executed under a synchronism between a spindle and a Z-axis, the mode select switches 12 and 22 are switched to the side "b". With this operation, during a positionly synchronized control, namely during a synchronous tapping operation, only the Z-axis enters a position instruction θrz* once into the filter means 23, and then the controlling apparatus 1a issues the position instruction as a position instruction θrz0*, and said position instruction θrz0* is entered into a comparator 10a. The subsequent operations are the same as those in the conventional type of machine tool controlling apparatus as described above. By adding this filter means 23, even if position loop gains $K_{PS}$, $K_{PZ}$ for a spindle and a Z-axis are different, the position orbits for the two can be equalized as described later.

Figure 2:
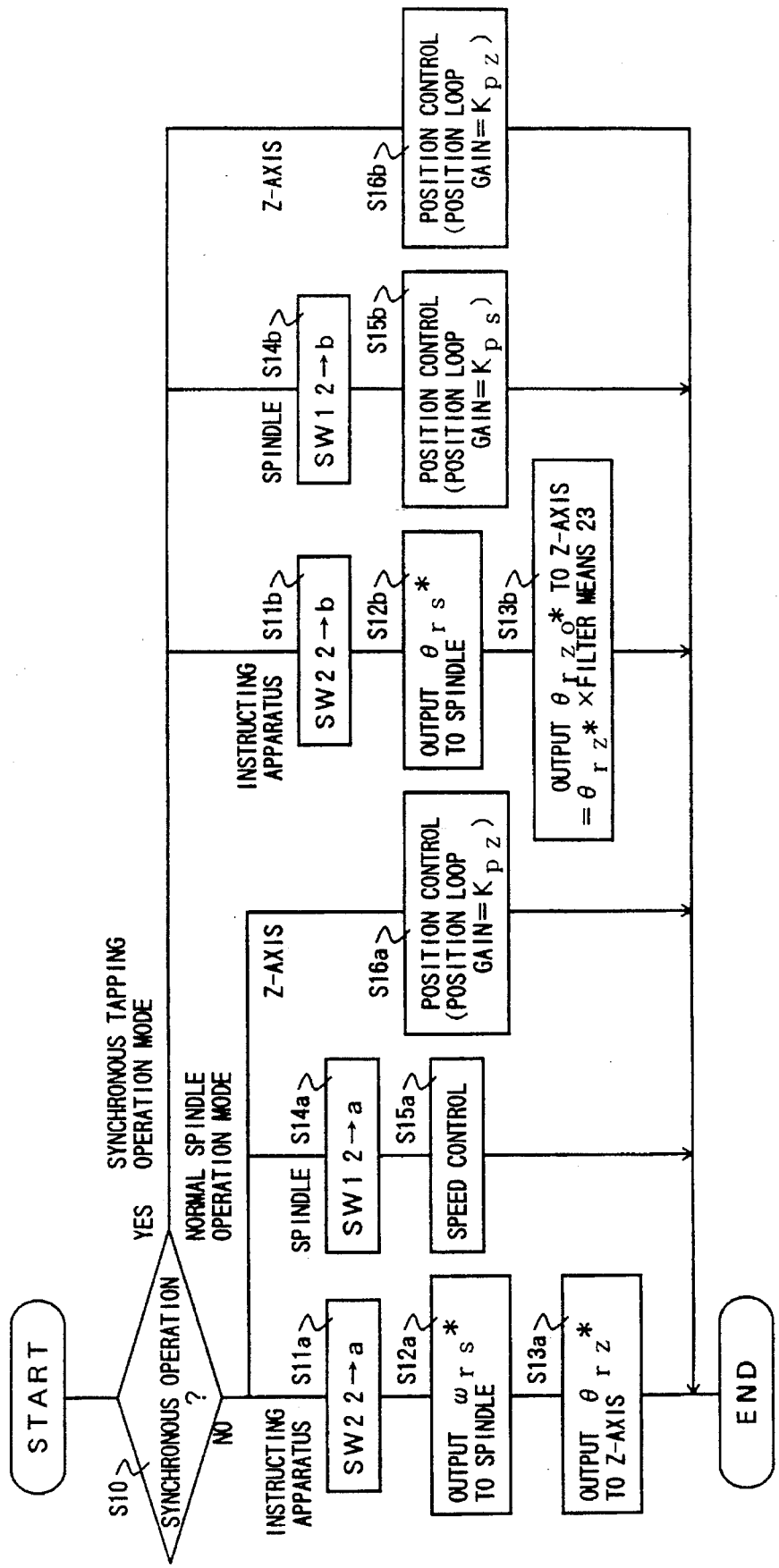
FIG. 2 is a flow chart illustrating operations of the machine tool controlling apparatus shown in FIG. 1.

FIG. 2 is a flow chart illustrating operations in the normal spindle operation mode as well as those in the synchronous tapping operation mode. At first, the machine tool controlling apparatus makes a determination as to whether the current operation is in the synchronous operation mode or not (S10), and if it is determined that the current operation is not in the synchronous operation mode, the controlling apparatus 1a sets the mode select switch 22 to side "a" (S11a), issues ωrs* as output to a spindle (S12a) and θrz* to a z-axis (S13a). Also the spindle sets the mode select switch 12 to side "a" (S14a), and executes speed control (S15a). Furthermore the Z-axis executes position control according to the position loop gain $K_{PZ}$ (S16b).

Figure 3A:
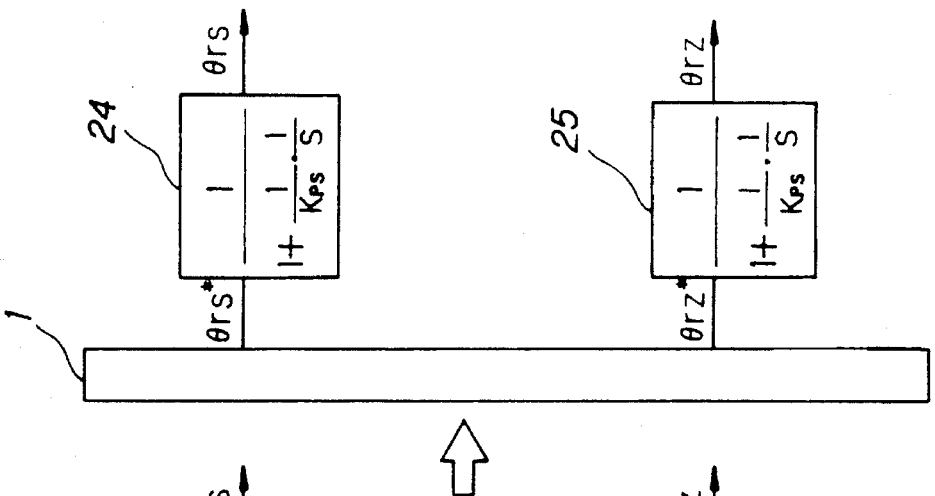
FIGS. 3A, B and C are views evidencing that, even if position loop gains $K_{PS}$, $K_{PZ}$ for a spindle and a subordinate axis are different, a position orbit of the two can be made identical.
Figure 3B:
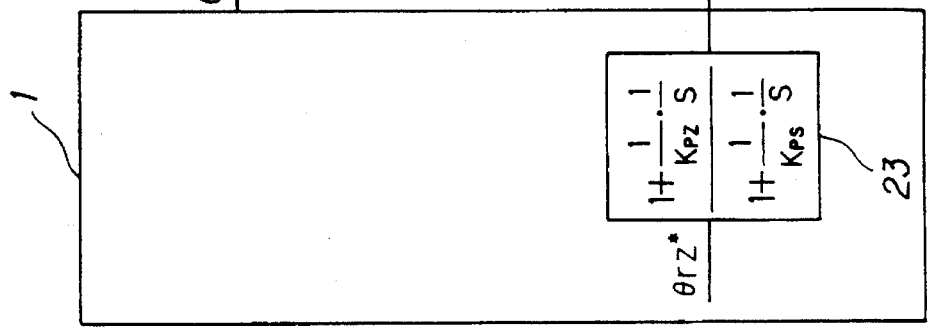
Figure 3C:
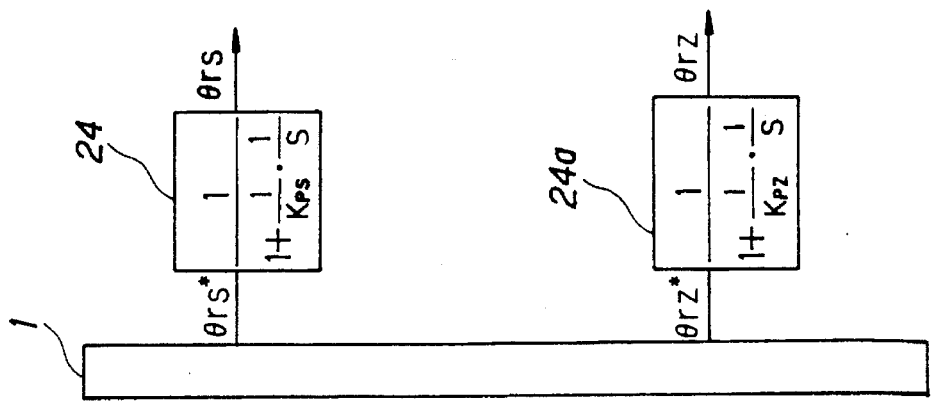

In the step S10 described above, if it is determined that the current operation is in the cyclic operation mode, the controlling apparatus 1a sets the mode select switch 22 to "b" (S11b), issues θrs* to the spindle (S12b) and θrz* is arranged via the filter means 23, and θrz0* (θrz*×transfer function for the filter means 23) is outputted to the Z-axis (S13b). Also the spindle sets the mode select switches 12 to the side "b" (S14b), and executes a position control according to the position loop gain $K_{PS}$(S15b). Furthermore, the Z-axis executes a position control according to the position loop gain $K_{PZ}$(S16b). FIGS. 3A–3C are a drawings evidencing that, even if position loop gains $K_{PS}$, $K_{PZ}$ for a spindle and a Z-axis are different, the position orbits for the two can be equalized. In FIGS. 3A–3C, the reference numerals 24, 24a indicate transfer functions up to θrs, θrz to the position instructions θrs*, θrz*, or θrz0* in a case where it is assumed that responses to a current loop as well as to a speed loop are infinite, the reference numeral 25 is transfer function between θrz and θrz, according to the present invention, which is obtained by multiplying the filter means 23 and the transfer function 24a in the Z-axis.

Figure 15:
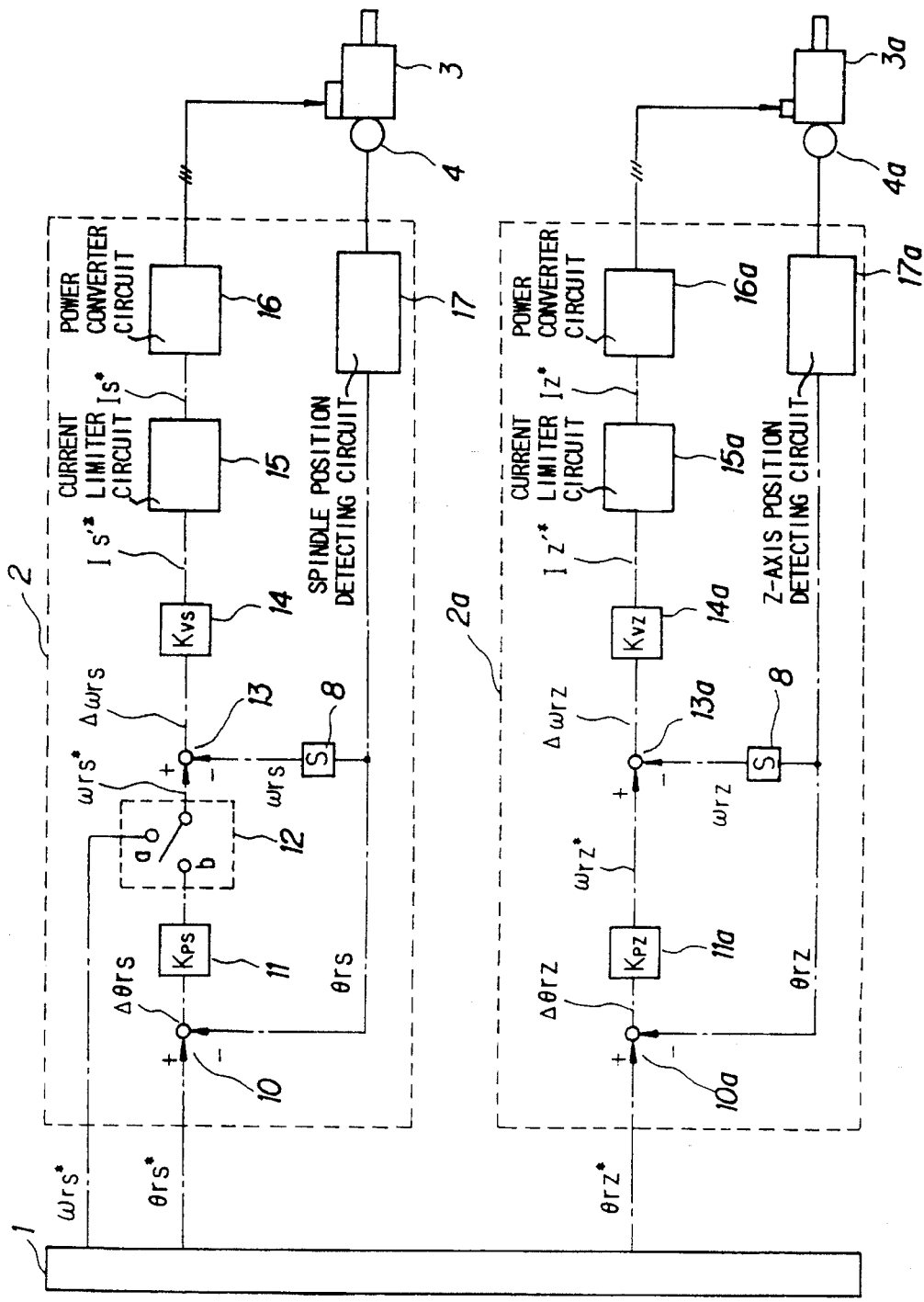
FIG. 15 is a control block diagram illustrating a general configuration of another machine tool controlling apparatus according to the conventional art.

FIG. 3A is a block diagram assuming that $K_{VS}$ and $K_{VZ}$ are infinite in the conventional type of controlling apparatus shown in FIG. 15. This figure clearly suggests that at least the condition of $K_{PS}=K_{Pz}$ is required in a synchronous tapping according to a position instruction. Also FIG. 3B is a block diagram assuming that $K_{VS}$ and $K_{VZ}$ are infinite in the control block shown in FIG. 1, and FIG. 3C is a modification thereof. From these figures, it is understood that, even if $K_{PS}$ is not equal to $K_{Pz}$, the spindle and the Z-axis have the same transfer function, namely they follow the same position orbit.

Figure 12:
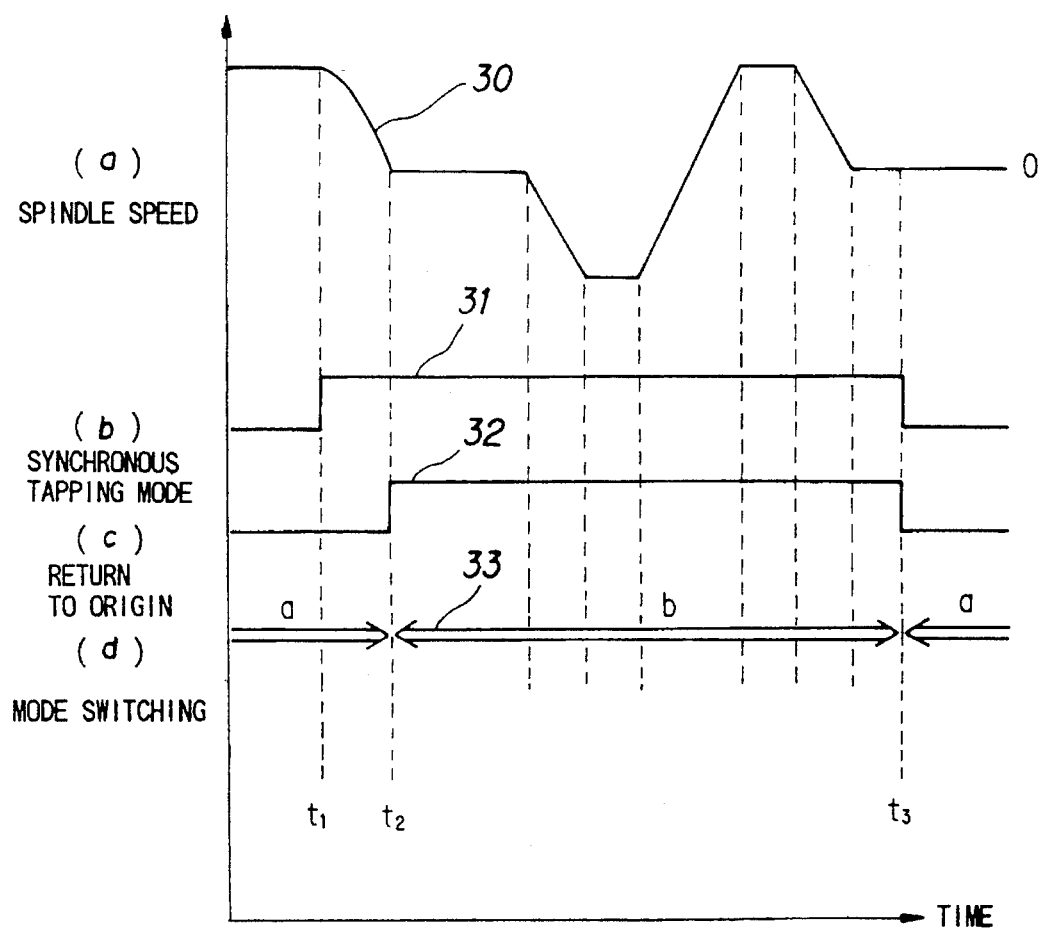
FIG. 12 is a timing chart illustrating a mode select operation of a machine tool controlling apparatus according to the present invention.

Now description is made for operations when the operation mode is switched from the normal spindle operation mode to the synchronous tapping operation mode with reference to FIG. 12. In this figure, the reference numeral 30 indicates a speed of spindle 5, the reference numeral 31 indicates a synchronous tapping mode period, the reference numeral 32 indicates a period while the synchronous tapping operation mode is kept returned to the origin, and the reference numeral 33 indicates a contact setting period for the mode select switches 12 and 22.

As shown in FIG. 12, waveforms (a) and (b), if a signal selecting the synchronous taping operation mode is entered from the controlling apparatus 1a to the spindle driving apparatus 2 at timing of t1, the spindle driving apparatus 2 is switched from a speed control mode to a position control mode, so that the operation to return to the origin as shown in FIG. 12(c) is executed. Before this operation to return to the origin is complete (at a timing of t2), as shown in FIG. 12 (d), the mode select switches 12 and 22 are set to a contact "a". At the timing t2 when the operation to return to the origin is complete, the mode select switches 12 and 22 are switched to a contact "b" and maintain the top edge until the synchronous tapping operation mode is released at the timing of t3, and the filter 23 is applied only to the Z-axis during this period.

Description is made below for effects of this first embodiment with reference to FIG. 13, waveforms (a), (b) and (d). In this figure, the reference numeral 35 indicates a spindle speed as well as a z spindle speed during a synchronous tapping operation, the reference numeral 36 indicates load fluctuation due to an external disturbance loaded to a spindle and a Z-axis, and the reference numeral 37 indicates a relative position difference between the spindle and the Z-axis (in a conventional type of controlling apparatus). It is ideal that this relative difference is zero, and the larger this value is, the lower the synchronous tapping precision is. Of the relative position differences 37 described above, FIG. 13, waveform (c) indicates that in the conventional type of controlling apparatus, a large relative position difference is generated due to the reasons as described above.

In contrast to the conventional art, in the first embodiment of the present invention as described above, as the filter means (including transfer function models for a spindle and Z-axis) is applied to a position instruction to the Z-axis only in the synchronous tapping operation mode, a position loop gain to load fluctuation due to external disturbance in the Z-axis is relatively raised as compared to that in the conventional type of controlling apparatus. As a result, it is possible to reduce a difference generated in association with load fluctuation due to external disturbance which has been a problem to be solved, as shown in FIG. 13, waveform (d). It should be noted that the reason why the filter means 23 is not applied to a position instruction for a spindle but to that for a Z-axis is that a position loop gain can generally be set to a larger value than that for a spindle. Also a speed response at the side of the Z-axis is higher, as described above; Accordingly, a spindle with a lower position loop response can not be adjusted according to a Z-axis with a high response.

Figure 4:
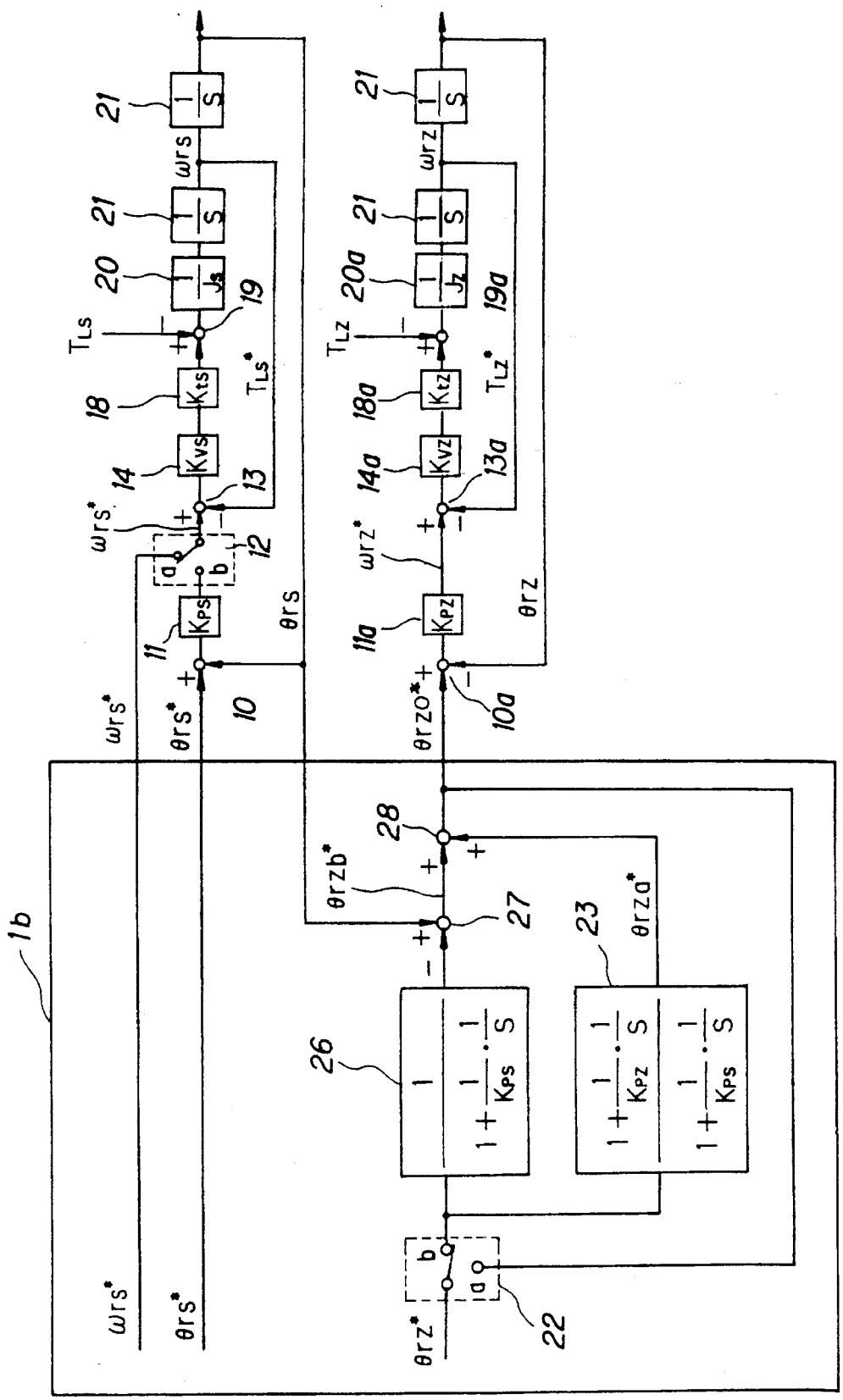
FIG. 4 is a control block diagram illustrating a generation configuration of a machine tool controlling apparatus according to the present invention.

Now description is made below for a second embodiment of the present invention. FIG. 4 is a control block diagram illustrating a general configuration of the second embodiment. In this figure, the reference numeral 1b is a controlling apparatus, the reference numeral 26 is the same filter means as the transfer function 24, the reference numeral 27 is a comparator which compares the output from the filter means 26 to the position feedback θrs by a spindle and issues a position error θrzb*, and the reference numeral 28 indicates an adder which adds an output θrzb* from the comparator 27 to an output θrza* from the filter means 23 and issues the sum as a final position instruction θrz0*.

Figure 16:
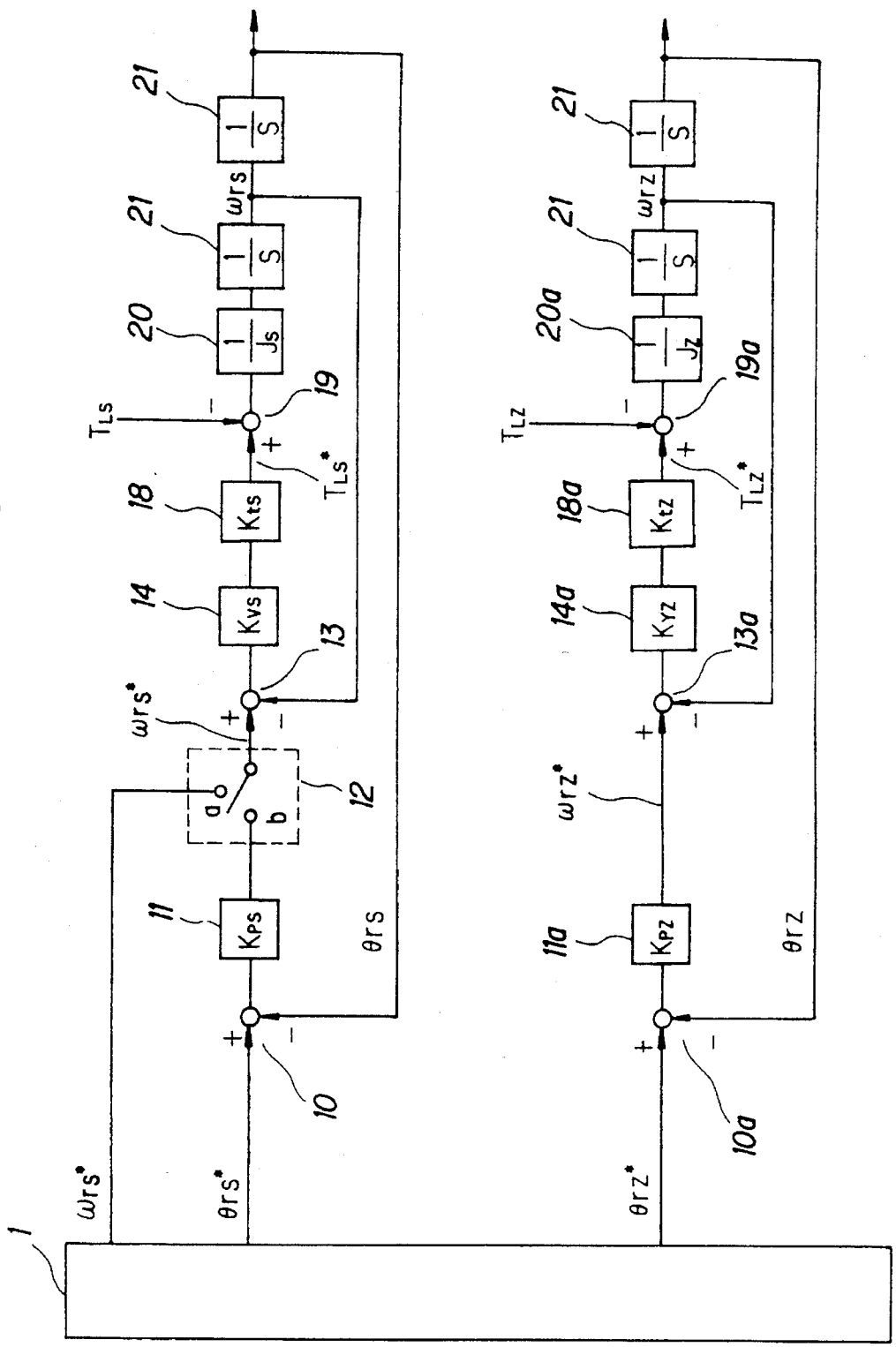
FIG. 16 is a control block diagram illustrating a general configuration of an controlling apparatus modified from the one shown in FIG. 15.

Now a description is made for operations of the controlling apparatus described above.
(1) Normal spindle operation mode At first, when a spindle is revolved in the normal speed instruction operation mode in which synchronous tapping is not executed, the mode select switches 12 and 22 are set to the side "a", and almost the same operations as those in the conventional art, as shown in FIG. 15 and FIG. 16, are executed.
(2) Synchronous tapping operation mode Then, when synchronous tapping is executed under a position synchronism with a Z-axis, the mode select switches 12 and 22 are switched to the side "b". with this operation, during a position synchronizing control, namely during a synchronous tapping operation mode, a sum of output θrza* obtained by filtering a position instruction θrs* through a filter means 26 and θrb* obtained by subtracting obtained by filtering the position instruction θrz* through the filter means 26 from the position feedback θrs for a spindle is issued as a final position instruction θrz0* by the instruction apparatus 1b, and said position instruction θrz0* is entered into the comparator 10a. The subsequent operation are the same as those in the aforesaid first embodiment.

Figure 5:
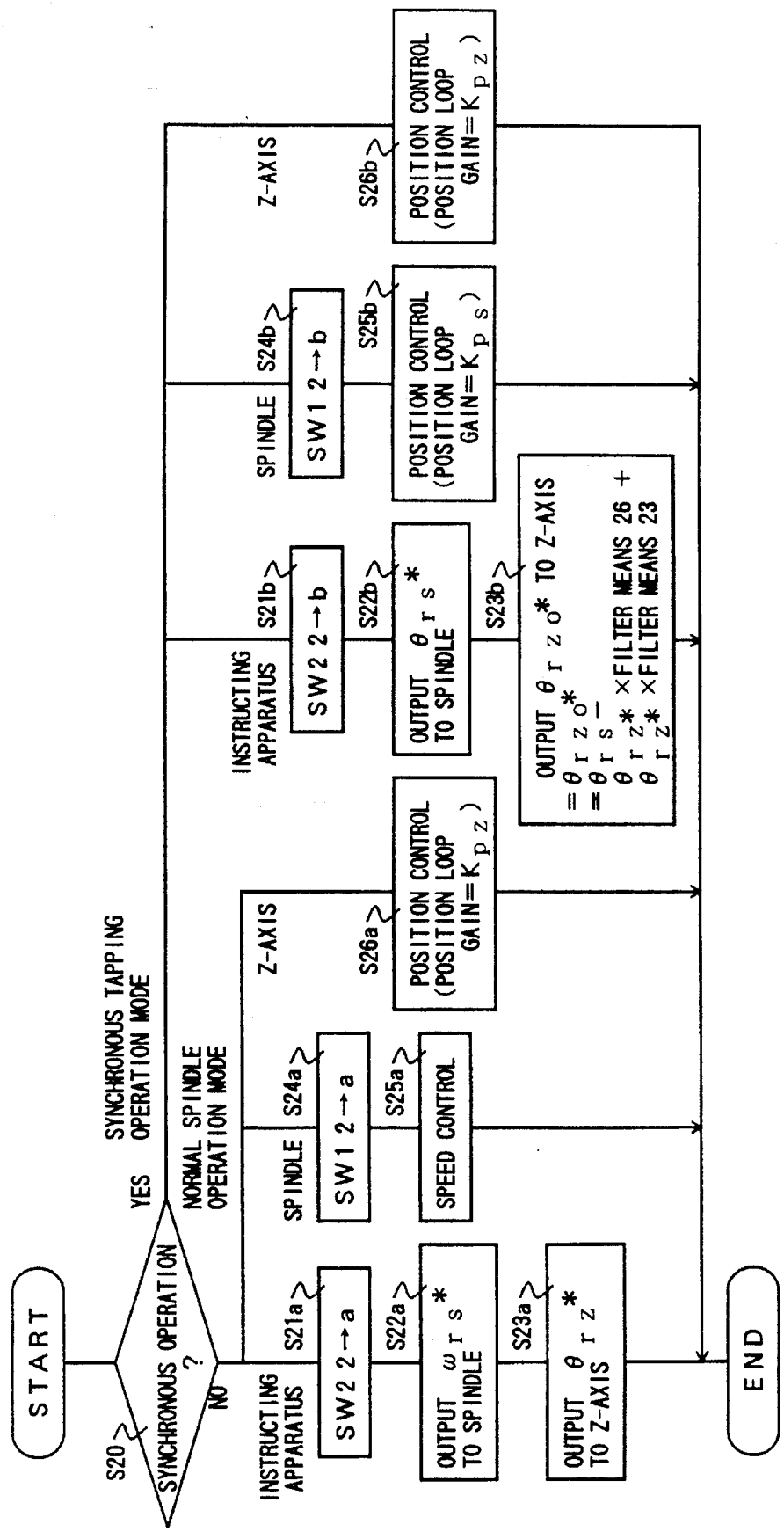
FIG. 5 is a flow chart illustrating operations of the machine tool controlling apparatus shown in FIG. 4.

FIG. 5 is a flow chart illustrating operations in the normal spindle operation mode and synchronous tapping operation mode, each described above. At first, whether the current operation is in a cyclic operation mode or not is determined (S20). If it is determined that the current operation is not in a cyclic operation, the controlling apparatus sets the mode select switch 22 to the side "a" (S21a), and issues ωrs* to a spindle (S22a) and θrz* to a Z-axis (S23a). Also the spindle sets the mode select switch 12 to the side "a" (S24a), and executes a speed control (S25a). Furthermore, the Z-axis executes a position control according to the position loop gain $K_{Pz}$(S26a).

In the step S20 described above, if it is determined that the current operation is in the cyclic operation mode, the controlling apparatus 1b sets the mode select switch 22 to the side "b" (S21b), issues θrs* to the spindle (S22b) and θrz0* (θrs−θrz*× transfer function for the filter means 26+θrz*× transfer function for the filter means 23) via the filter means 23, the filter means 26, comparator 27 and adder 28 (S23b). Also the spindle sets the mode select switches 12 to the side "b" (S24b), and executes a position control according to the position loop gain $K_{PS}$(S25b). Furthermore, the Z-axis executes a position control according to the position loop gain $K_{Pz}$(S26b).

Thus, as the output of a transfer function mode for a spindle (namely a compensating means by applying a difference between an ideal position of the spindle and a position feedback by the spindle to a position instruction for a Z-axis) is added to the first embodiment described above, so that, even if the position loop gains $K_{PS}$, $K_{Pz}$ are different, or also even if the speed loop gain is not infinite, the position orbits for the two can be made identical.

Figure 6:
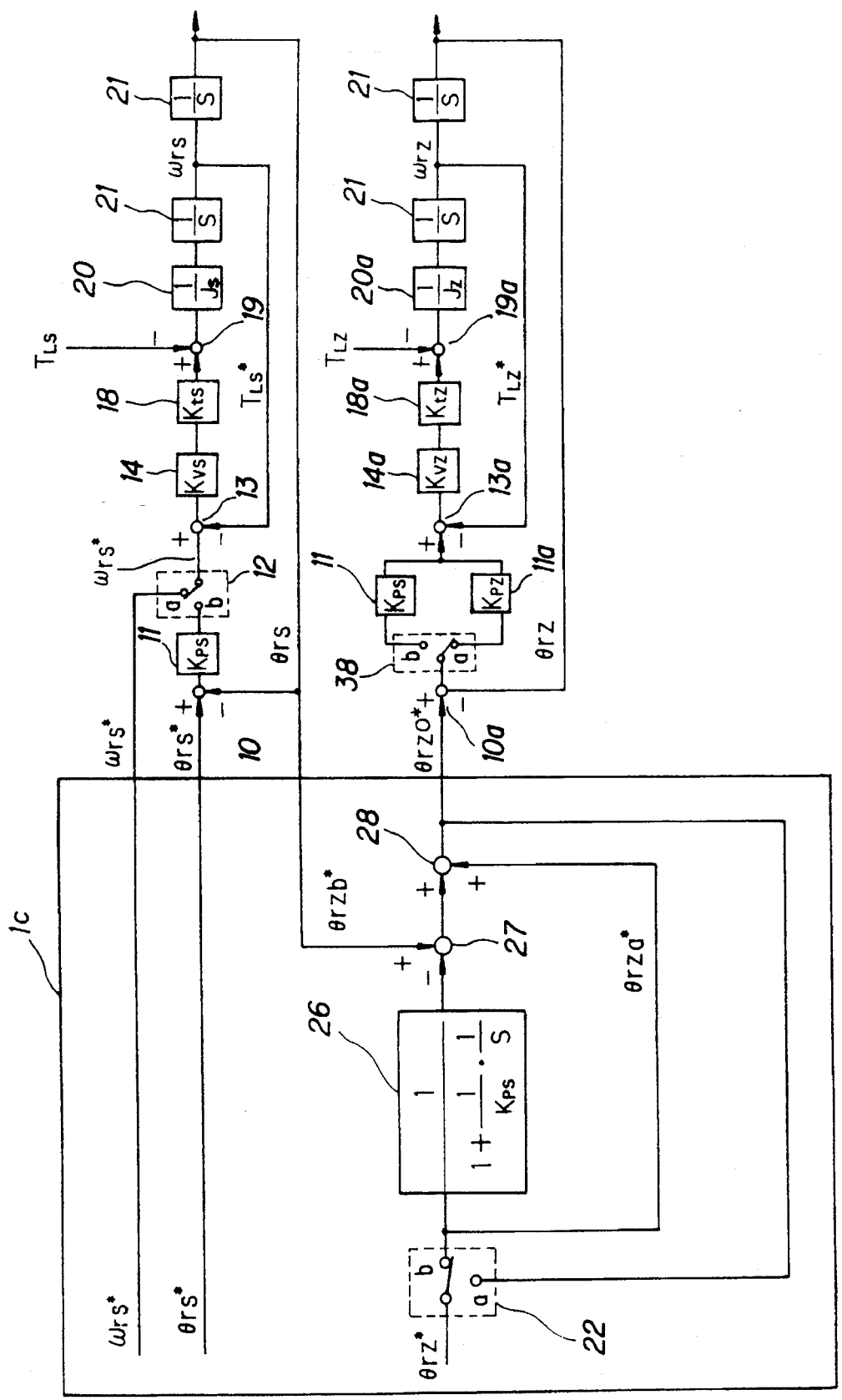
FIG. 6 is a control block diagram illustrating a general configuration of a machine tool controlling apparatus according to the present invention.

Now description is made for a third embodiment of the present invention. FIG. 6 is a control block diagram illustrating a general configuration of the third embodiment. In this figure, the reference numeral 1c is a controlling apparatus, the reference numeral 38 indicates a mode select switch which switches under the same conditions as those for the mode select switches 12 and 22.

Now description is made for operations in the third embodiment.

(1) Normal spindle operation mode

At first, in the normal speed instructing operation mode in which synchronous tapping for a spindle is not executed, the mode select switches 12, 22 and 38 are set to the side "a", and almost the same operations as those shown in FIG. 15 and FIG. 16 are executed.

(2) Synchronous tapping operation mode

Then, when synchronous tapping is executed under a position synchronism with a Z-axis, the mode select switches 12, 22 and 38 are switched to the side b. With this operation, during a position synchronizing control, namely during a synchronous tapping operation mode, a sum of output θrza* (which is the same value as the position instruction θrz* only in the Z-axis) and θrzb* (obtained by subtracting obtained by filtering the position instruction θrz* through the filter means 26 from the position feedback θrs for a spindle) is issued as a final position instruction θrz0* by the instruction apparatus 1c. That position instruction θrz0* is entered into the comparator 10a. At the same time, a position loop gain for the Z-axis driving apparatus 2a is switched from $K_{PS}$ to $K_{PZ}$ by the mode select switch 38. The subsequent operations are the same as those in the aforesaid first embodiment.

Figure 7:
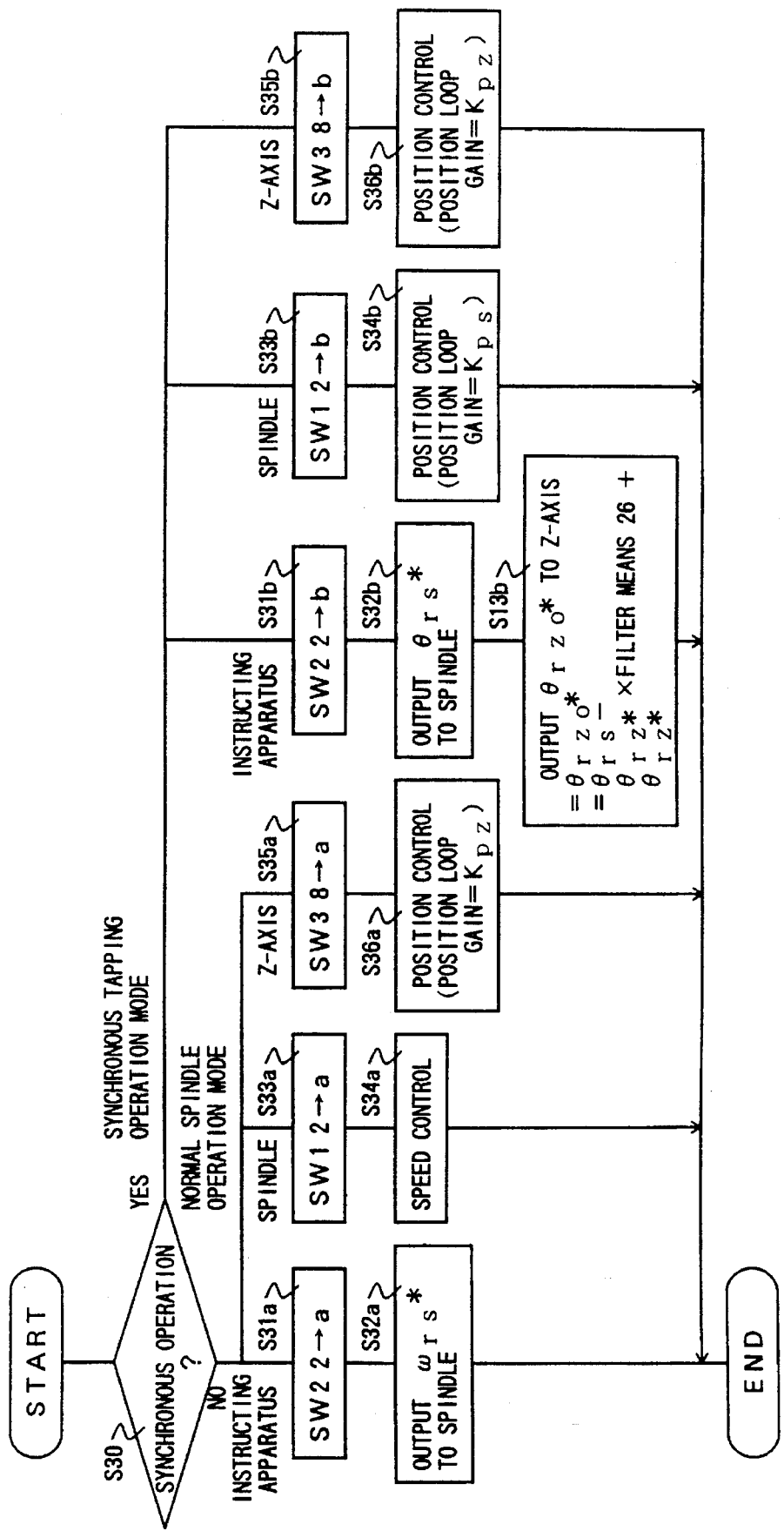
FIG. 7 is a flow chart of the machine tool controlling apparatus shown in FIG. 6.

FIG. 7 is a flow chart illustrating operations in the normal spindle operation mode and synchronous tapping operation mode as described above. At first, whether the current operation is in a cyclic operation mode or not is determined (S30). If it is determined that the current operation is not in a cyclic operation, the controlling apparatus 1c sets the mode select switch 22 to the side "a" (s31a), and issues ωrs* to a spindle (S32a). Also the spindle sets the mode select switch 12 to the side "a" (S33a), and executes a speed control (S34a). Furthermore, the Z-axis sets the mode select switch 38 to the side "a" (S35a) and executes a position control according to the position loop gain $K_{PZ}$ (S36a).

In the step S30 described above, if it is determined that the current operation is in the cyclic operation mode, the controlling apparatus 1c sets the mode select switch 22 to the side "b" (S31b), issues θrs* to the spindle (S32b) and θrz0* (θrs−θrz*− transfer function for the filter means 26+θrz*) via the filter means 26, comparator 27 and adder 28 (S37). Also the spindle sets the mode select switches 12 to the side "b" (S33b), and executes a position control according to the position loop gain $K_{PS}$ (S34b). Furthermore, the Z-axis sets the mode select switch 38 to the side "b" (S35b) and executes a position control according to the position loop gain $K_{PS}$ (S36b).

Thus, not only because a position loop gain $K_{PS}$ for a spindle and a position loop gain $K_{PZ}$ for a Z-axis are made identical, but also, because an output of a transfer function mode for a spindle (namely a compensating means by applying a difference between an ideal position of the spindle and a position feedback by the spindle to a position instruction for a Z-axis) is added to the first embodiment described above, even if the position loop gains $K_{PS}, K_{PZ}$ are different and not infinite, the position orbits for the two can be made identical.

Figure 8:
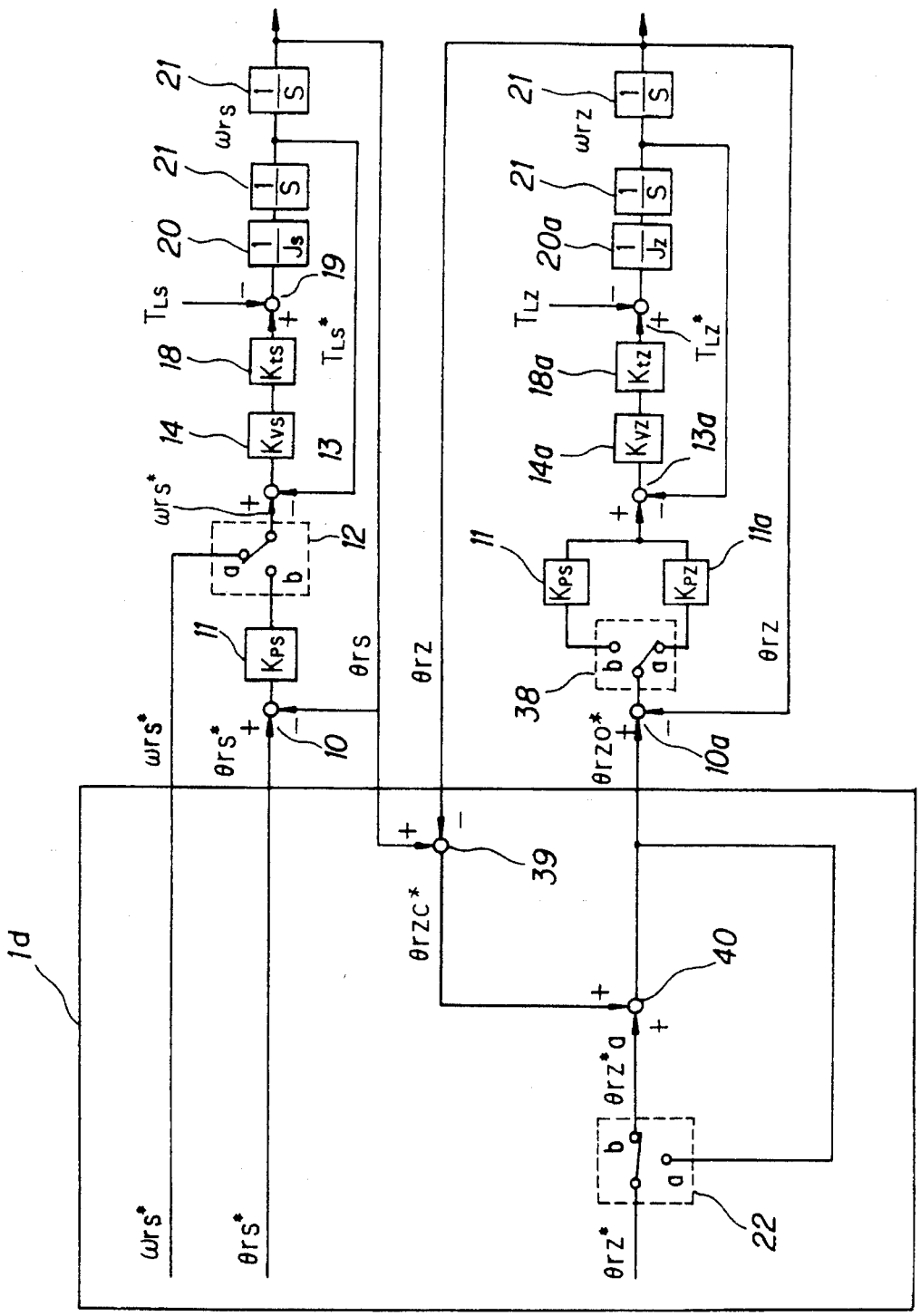
FIG. 8 is a control block diagram illustrating a general configuration of a machine tool controlling apparatus according to the present invention.

Now description is made below for a fourth embodiment of the present invention. FIG. 8 is a control block diagram illustrating a general configuration of the fourth embodiment. In this figure, the reference numeral 1d is a controlling apparatus, the reference numeral 39 indicates a comparator which compares the position feedback θrs to the position feedback θrz for the Z-axis and issues a relative position difference θrzc*. The reference numeral 40 indicates an adder which adds output from the comparator 39 to θrza* which is the same value as the position signal θrz*.

Now description is made for operations in the fourth embodiment described above.

(1) Normal spindle operation mode

At first, in the normal speed instructing operation mode in which synchronous tapping for a spindle is not executed, the mode select switches 12, 22 and 38 are set to the side "a", and almost the same operations as shown in FIG. 15 and FIG. 16 are executed.

(2) Synchronous tapping operation mode

Then, when synchronous tapping is executed under a position synchronism with a Z-axis, the mode select switches 12, 22 and 38 are switched to the side b. With this operation, during a position synchronizing control, namely during a synchronous tapping operation mode, a sum of output θrza* (which is the same value as the position instruction θrz* only in the z-axis) and θrzc* (obtained by subtracting a feedback by a Z-axis from a position feedback θrs by the spindle) is issued by the controlling apparatus 1d and entered into the comparator 10a. At the same time, a position loop gain for the Z-axis driving apparatus 2a is switched from $K_{PZ}$ to $K_{PS}$ by the mode select switch 38. The subsequent operations are the same as those in the aforesaid first embodiment.

Figure 9:
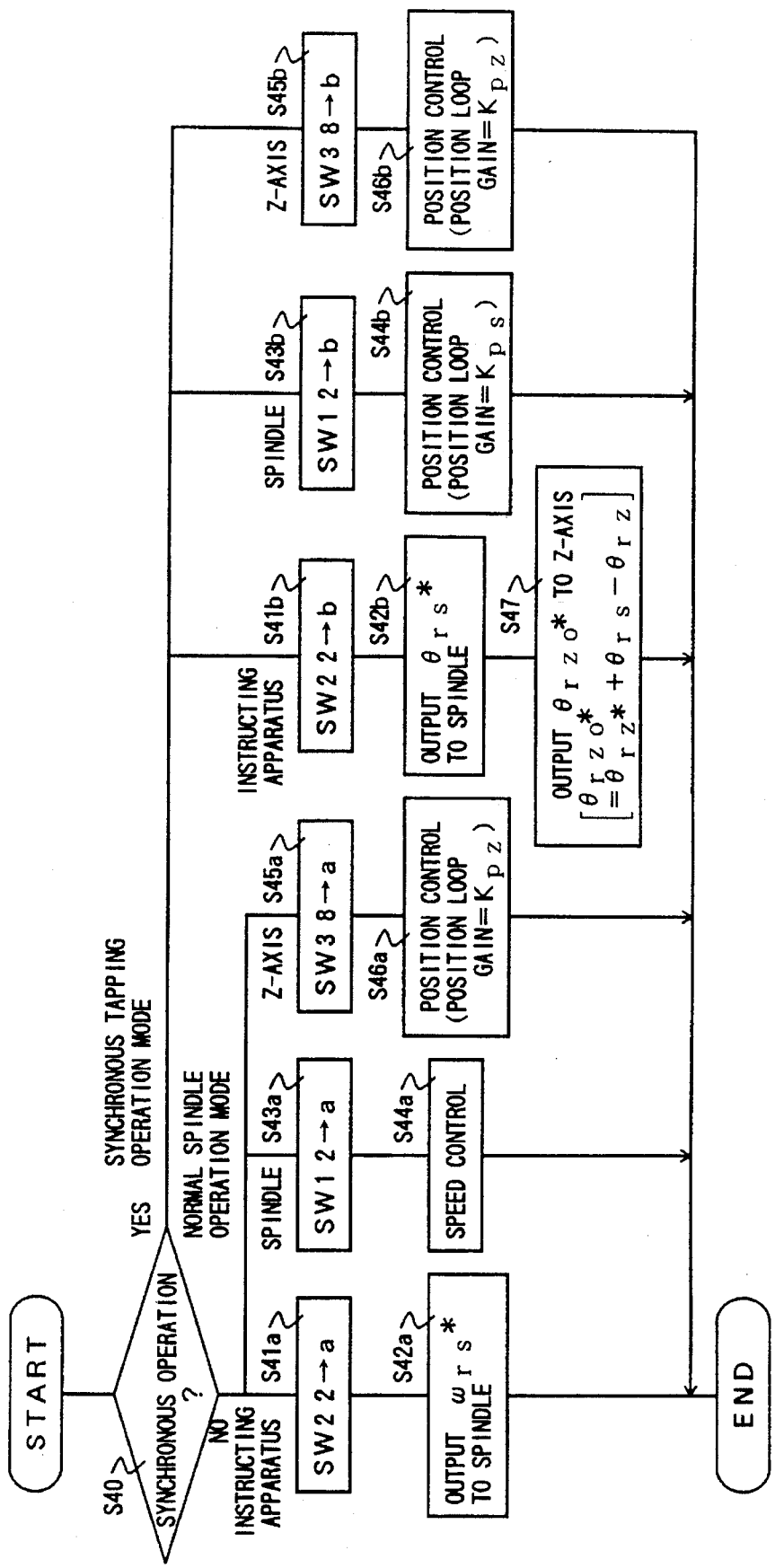
FIG. 9 is a flow chart illustrating operations of the machine tool controlling apparatus shown in FIG. 8.

FIG. 9 is a flow chart illustrating operations in the normal spindle operation mode and synchronous tapping operation mode as described above. At first, whether the current operation is in a cyclic operation mode or not is determined (S40), and if it is determined that the current operation is not in a cyclic operation, the controlling apparatus 1d sets the mode select switch 22 to the side "a" (S41a), and issues ωrs* to the spindle (S42a). Also the spindle sets the mode select switch 12 to the side "a" (S43a), and executes a speed control (S44a). Furthermore, the Z-axis sets the mode select switch 38 to the side "a" (S45a) and executes a position control according to the position loop gain $K_{PZ}$ (S46a).

In the step S40 described above, if it is determined that the current operation is in the cyclic operation mode, the controlling apparatus 1d sets the mode select switch 22 to the side "b" (S41b). It issues θrs* to the Z-axis (S42b) and θrz* is arranged via the comparator 39 and the adder 40, and θrz0* (θrz*+ θrs −rz) is outputted to the Z-axis (S47). Also the spindle sets the mode select switches 12 to the side "b" (S43b), and executes a position control according to the position loop gain $K_{PS}$ (S44b) Furthermore, the Z-axis sets the mode select switch 38 to the side "b" (S45b) and executes a position control according to the position loop gain $K_{PZ}$ (S46b).

Thus, a position loop gain KPS for a spindle and a position loop gain $K_{PZ}$ for a Z-axis are made identical, and as a compensating means, a difference between a position feedback by the spindle and a position feedback by the Z-axis is applied anew to a position instruction for the Z-axis. Accordingly, even if the position loop gains are different and not infinite, the position orbits for the two can be made identical.

Figure 10:
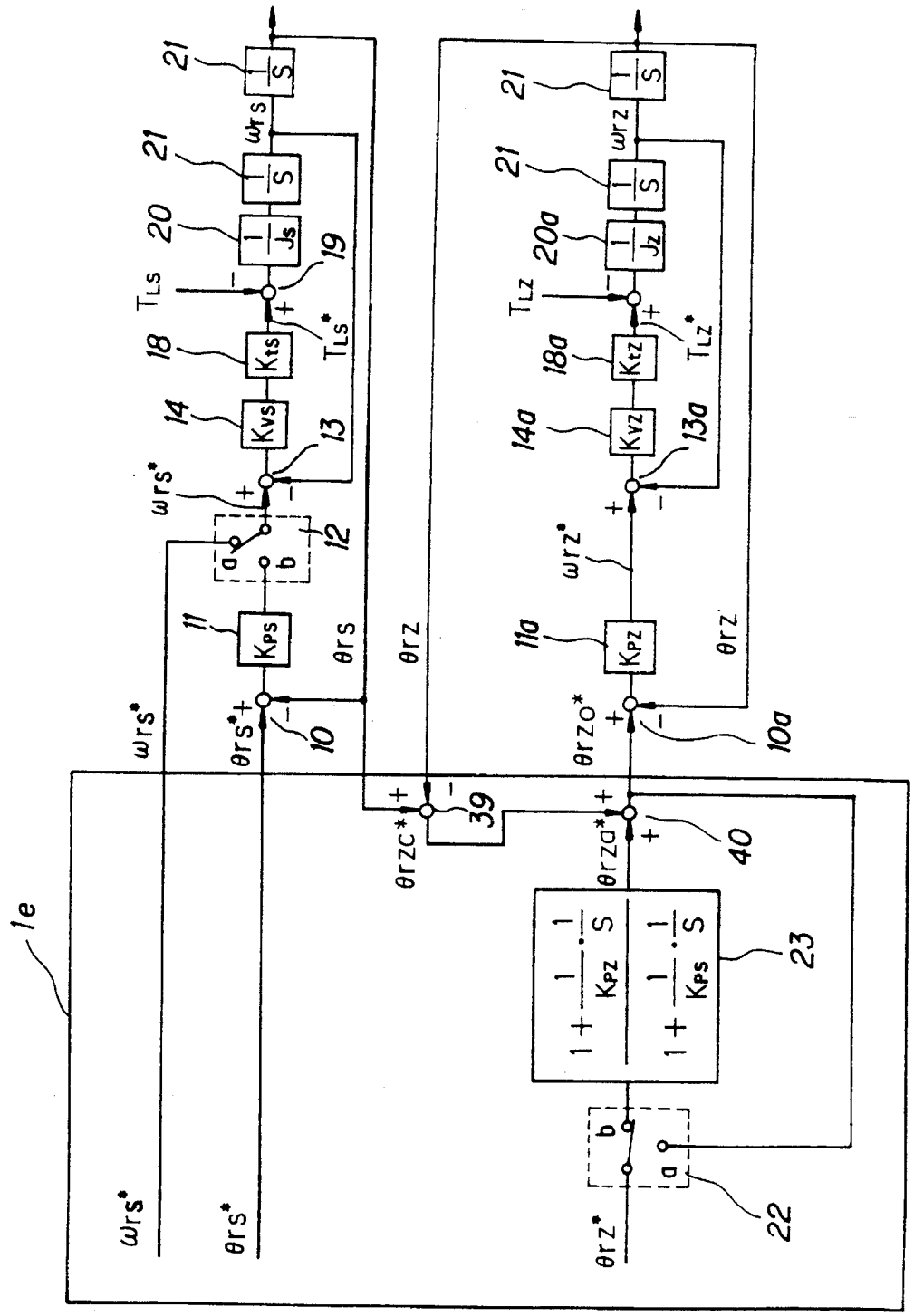
FIG. 10 is a control block diagram illustrating a general configuration of a machine tool controlling apparatus according to the present invention.

Now description is made below for a fifth embodiment of the present invention. FIG. 10 is a control block diagram illustrating a general configuration of the fifth embodiment. In this figure, the reference numeral 1e is a controlling apparatus, the reference numeral 23 indicates a filter means which is the same as that shown in the first embodiment described above. The reference numerals 39, 40 comprise a comparator which compares the position feedback θrs shown in the fourth embodiment 4 above to the position feedback θrz by a Z-axis and issues a relative position difference signal θrzc*. Finally, there is an adder which adds an output from said comparator 39 to θrza*, which is the same value as the position instruction θrz*.

Now description is made for operations in the fourth embodiment described above.

(1) Normal spindle operation mode

At first, in a case where a spindle is revolved in the normal speed instructing operation mode without executing synchronous tapping, the mode select switches 12, 22 are set to the side "a", and almost the same operations as shown in FIG. 15 and FIG. 16 are executed.

(2) Synchronous tapping operation mode

Then, when synchronous tapping is executed under a position synchronism with a Z-axis, the mode select switches 12, 22 are switched to the side "b". With this operation, during a position synchronizing control, namely during a synchronous tapping operation mode, a sum of output θrza* (obtained by filtering the position θrz* through the filter means 23) and θrzc* (obtained by subtracting a feedback by a Z-axis from a position feedback θrs by a spindle) is issued by the controlling apparatus 1e as the final position instruction θrz0*, and the position instruction θrz0* is entered into the comparator 10a. The subsequent operations are the same as those in the aforesaid first embodiment.

Figure 11:
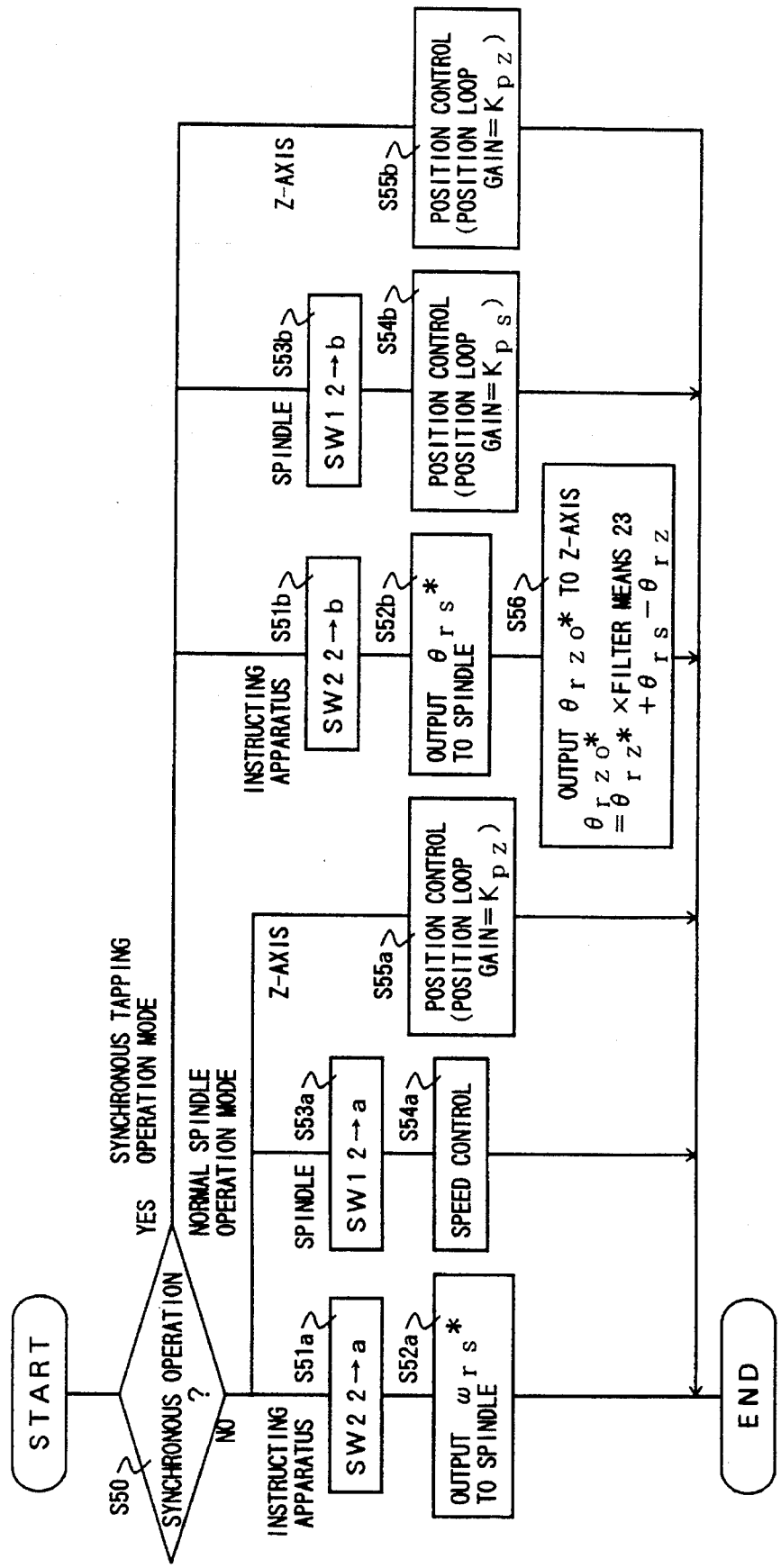
FIG. 11 is a flow chart illustrating operations of the machine tool controlling apparatus shown in FIG. 10.

FIG. 11 is a flow chart illustrating operations in the normal spindle operation mode and synchronous tapping operation mode each described above. At first, whether the current operation is in a cyclic operation mode or not is determined (S50), and if it is determined that the current operation is not in a cyclic operation, the controlling apparatus 1e sets the mode select switch 22 to the side "a" (S51a), and issues ωrs* to a spindle (S52a). Also the spindle sets the mode select switch 12 to the side "a" (s53a), and executes a speed control (S54a). Furthermore, the Z-axis executes a position control according to the position loop gain $K_{PZ}$ (S55a).

In the step S50 described above, if it is determined that the current operation is in the cyclic operation mode, the controlling apparatus 1e sets the mode select switch 22 to the side "b" (S51b), issues θrs* to the spindle (S52b) and θrz* is arranged via the filter means 23, the comparator 39 and the adder 40. Finally, θrz0* (θrz*× transfer function for filter 23+θrs−θrz) is outputted to the Z-axis (S56). Also the spindle sets the mode select switches 12 to the side "b" (S53b), and executes a position control according to the position loop gain $K_{PS}$ (S54b). Furthermore, the Z-axis executes a position control according to the position loop gain $K_{PZ}$ (S55b).

Thus, as a compensating means, a difference between a position feedback by a spindle and that by a Z-axis to a position instruction for the Z-axis is introduced anew. Accordingly, even if the position loop gains $K_{PS}$ and $K_{PZ}$ are not infinite and different in the two, the position orbits for the two can be made identical.

Figure 13:
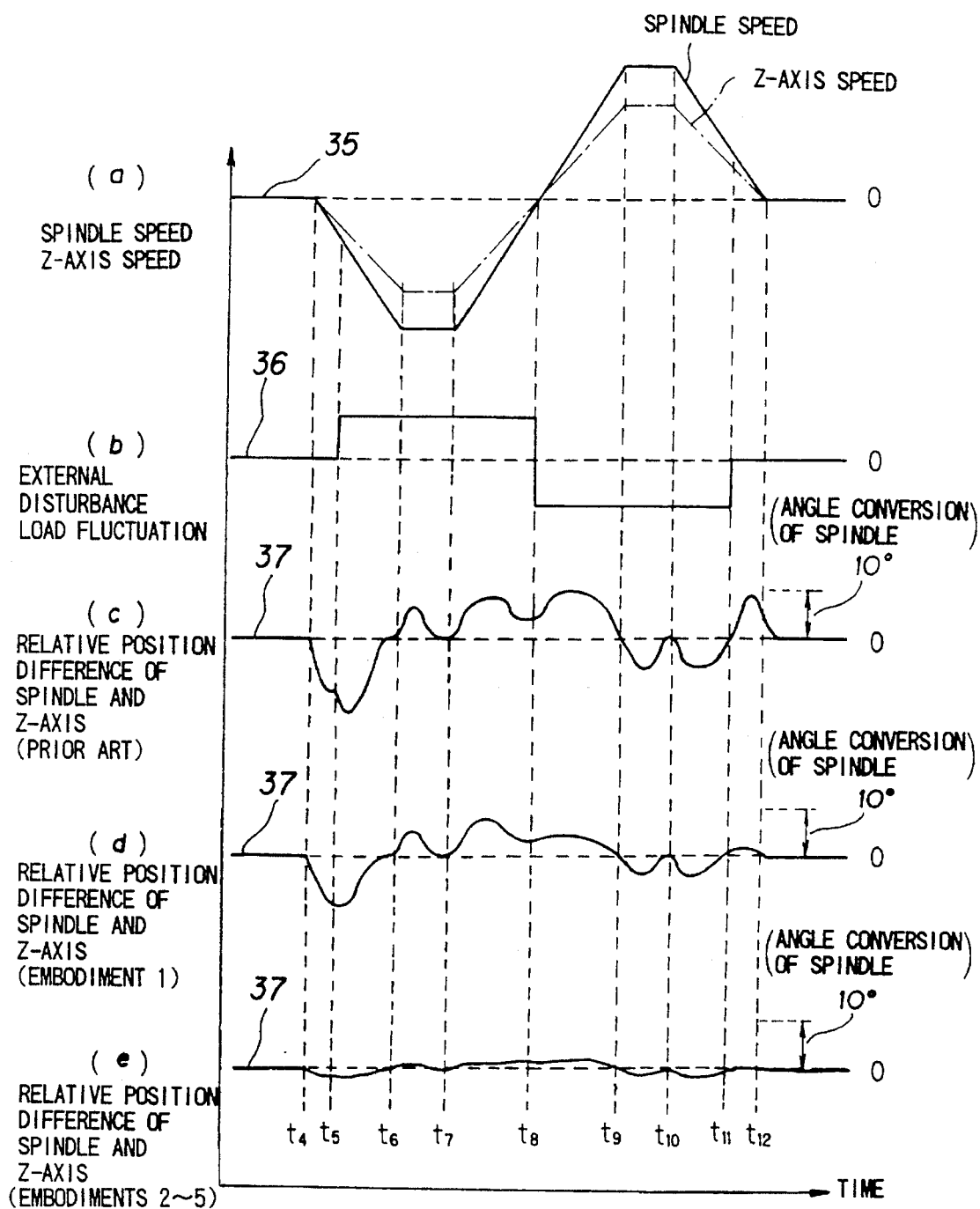
FIG. 13 is a timing chart showing a difference between position error waveforms in a machine tool controlling apparatus according to the present invention.
Figure 14:
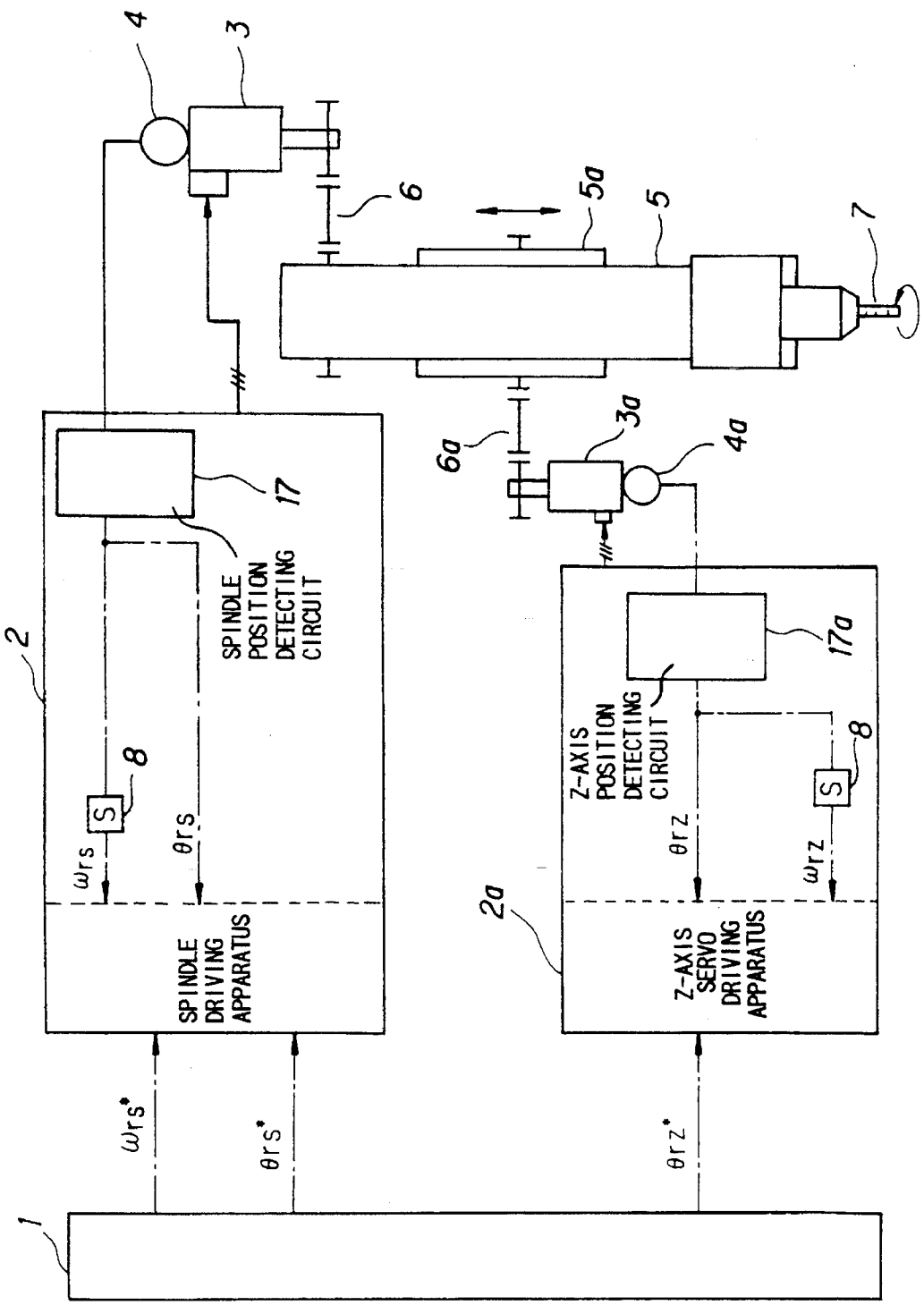
FIG. 14 is a control block diagram illustrating a general configuration of a machine tool controlling apparatus based on the conventional art.

Now description is made for effects in the second to fifth embodiments reference to FIG. 13 (e). As shown in FIG. 13, waveform (c), when synchronous tapping is executed in a system based on the conventional art, a large relative position difference is generated.

Also in the first embodiment 1 described above, as a filter means is applied based on considerations on transfer function models for a spindle and a Z-axis is applied to a position instruction for a Z-axis only in a synchronous tapping mode, a difference generated due to speed change and load fluctuation by external disturbance, each having being a problem to be solved, can be reduced as shown in FIG. 13, waveform (d). However, the condition assumed in the first embodiment that the speed loop gain is infinite is actually impossible, and for this reason sometimes it may be impossible to eliminate a relative position difference due to a difference in speed loop response between a spindle and a Z-axis in a synchronous tapping operation.

In the embodiments 2 to 5 described above, as a position instruction for a Z-axis is compensated in real time using position feedback for a spindle and a Z-axis, the compensating function is effective not only in load fluctuation due to external disturbance but also in an accelerating or decelerating operation. For this reason, it is possible to reduce a position difference between a spindle and a Z-axis more in the embodiment 1 described above, as shown in FIG. 13, wave form (e). Actually in the second to fifth embodiments, a relative position difference waveform may be slightly different from embodiment to embodiment, but the effect provided by each embodiment is almost the same, an representative waveforms are shown in FIG. 13, waveform (e).

Next, a description is made below for the "synchronous operation system" disclosed in the Japanese Patent Laid Open Publication No. 191606/1984 as well as for the differences from each of the embodiments described above. In this "synchronous operation system", there is a compensating system in which a difference between a position of a spindle and that of a subordinate axis is added to a position of the subordinate axis. Although a similar system in which a difference between a position of a spindle and that of a subordinate axis is added to a position of the subordinate axis system also in each of the embodiments described above, this "synchronous operation system" has the different features as described below.

In the fourth embodiment described above, in an operation mode in which synchronism between a spindle and a subordinate axis (Z-axis) is not necessary, the Z-axis forms a position loop according to the position loop gain $K_{PS}$ ($K_{PZ}>K_{PS}$) by switching the mode select switches 12, 22, and 38 to the side "a". In contrast, as the "synchronous operation system" described above has no a gain switching means, it is essential to keep a position loop gain for a subordinate axis always identical with that for a spindle so that synchronism between the spindle and the subordinate axis can be maintained. For this reason, comparison between the embodiment above to the "synchronous operation system" described above suggests that, although effects provided by the two embodiments are almost equal in the positionly synchronized mode, the responsiveness of a subordinate axis in the present embodiment having a gain switching function is higher than that of the "synchronous operation system" described above in a mode in which position synchronism is not required.

In the fifth embodiment described above, in a mode in which synchronism between a spindle and a subordinate axis is not required, a Z-axis forms a position loop according to the position loop gain $K_{PZ}$ ($K_{PZ}>K_{PS}$) by switching the mode select switch 12, 22 to the side "a". Also the responsibility to a position instruction in a spindle is equalized to that in a subordinate axis via the filter means 23 by switching the mode select switches 12, 22 to the side "b", so that responsibility to load fluctuation due to external disturbance in the subordinate axis is higher than that in the spindle. In contrast to it, the aforesaid "synchronous operation system"

has a gain switching means, so that it is essential to keep a position loop gain for a subordinate axis always identical with that for a spindle for maintenance of synchronism between the spindle and the subordinate axis. For this reason, with respect to the fifth embodiment and the "synchronous operation system" described above, responsibility in the subordinate axis is higher as compared to that in the "synchronous operation system" in the positionly synchronized operation mode. Also it is possible to raise the responsiveness to an instruction as well as to an external disturbance in a mode in which synchronism between the spindle and the subordinate axis is not required.

Also in each of the embodiments described above, the controlling apparatus 1 comprises such software as the mode select switch 22, a filter means 23, 26, comparators 27, 28, adders 28, 40, and a relative position difference gain circuit 41, but equivalent means can be built using only hardware in all the sections.

Each of the aforesaid embodiments is described by introducing a "semi-closed loop" system to detect a motor edge as an example of the synchronous tapping system, but also a similar means can be built for a full-closed loop system to detect a machine edge. Furthermore, where a filter means is applied to an controlling apparatus in each of the embodiments described above, the same effect can be achieved by applying the filter means to a Z-axis controlling apparatus.

Furthermore, description of each of the embodiments is limited to a synchronous tapping function as an example for easy understanding. However, other functions in which a spindle driving apparatus and a subordinate axis driving apparatus work in a synchronized mode and other functions for synchronous operation of two or more spindle driving apparatuses to drive two or more machine systems can be built using similar means.

A machine tool controlling apparatus according to the present invention controlling a speed and a position of a spindle and subordinate axis by issuing a speed instruction or a position speed to a controlling apparatus in machine tool having a position synchronizing instruction for and between the spindle and other subordinate axis has a switching means which switches between the normal spindle operation mode and the positionly synchronized operation mode wherein a spindle and subordinate axis are positionly synchronized, and a filter means for applying with the aforesaid switching means a transfer function model for the spindle and the subordinate axis into a position instruction issued only in positionly synchronized operation mode.

In a machine tool controlling method according to the present invention to control a speed or a position of a spindle or a subordinate axis by issuing a speed instruction or a position instruction to a machine tool controlling apparatus having a position synchronizing function for and between the spindle and the subordinate axis, whether the current operation is in the normal operation mode of the spindle or in the positionly synchronized operation mode in which the spindle and the subordinate axis are positionly synchronized is determined, and if it is determined that the current operation is in the positionly synchronized operation mode, a transfer function model for a spindle and subordinate axis is extrapolated to a position instruction issued to the subordinate axis.

A machine tool controlling apparatus according to another embodiment of the present invention controlling a speed and a position of a spindle and a subordinate axis by issuing a speed instruction or a position speed to a controlling apparatus in machine tool having a position synchronizing instruction for and between the spindle and other subordinate axis has a switching means which switches between the normal spindle operation mode and the positionly synchronized operation mode wherein a spindle and subordinate axis are positionly synchronized, a filter means for applying a transfer function model for the spindle and the subordinate axis into a position instruction issued only in positionly synchronized operation mode with the aforesaid switching means, and a compensating means for adding a difference between output from a transfer function model for the spindle and a position feedback by the spindle to a position instruction issued from the filter means described above.

In a machine tool controlling method according to the aforesaid embodiment of the present invention to control a speed or a position of a spindle or a subordinate axis by issuing a speed instruction or a position instruction to a machine tool controlling apparatus having a position synchronizing function for and between the spindle and the subordinate axis, whether the current operation is in the normal spindle operation mode or in the positionly synchronized operation mode in which the spindle and the subordinate axis are positionly synchronized is determined, and if it is determined that the current operation is in the positionly synchronized operation mode, transfer function models for a spindle and a subordinate axis are applied to a position instruction issued to the subordinate axis, and a difference between output from the transfer function for the spindle and a position feedback by the spindle is added to the position instruction.

A machine tool controlling apparatus according to a different embodiment of the present invention controlling a speed and a position of a spindle and subordinate axis by issuing a speed instruction or a position speed to a controlling apparatus in machine tool having a position synchronizing instruction for and between the spindle and other subordinate axis has a switching means which switches between the normal spindle operation mode and the positionly synchronized operation mode wherein a spindle and subordinate axis are positionly synchronized, a compensating means for adding a difference between output from the transfer function model for the spindle and the position feedback by the spindle to a position instruction to be issued to the subordinate axis only in the positionly synchronized operation with the aforesaid switching means, and a setting means for setting a position loop gain for the subordinate axis to the same value as that for the spindle.

In a machine tool controlling method according to the different embodiment aforesaid embodiment of the present invention described above to control a speed or a position of a spindle or a subordinate axis by issuing a speed instruction or a position instruction to a machine tool controlling apparatus having a position synchronizing function for and between the spindle and the subordinate axis, whether the current operation is in the normal operation mode of the spindle or in the positionly synchronized operation mode in which the spindle and the subordinate axis are positionly synchronized is determined, and if it is determined that the current operation is in the positionly synchronized operation mode, a difference between output from a transfer function model for and a position feedback by the subordinate axis is added to a position instruction to be issued to the subordinate axis, and at the same time a position loop gain for the subordinate axis is set to the same value as that for the spindle.

A machine tool controlling apparatus according to a further different embodiment of the present invention controlling a speed and a position of a spindle and subordinate axis by issuing a speed instruction or a position speed to a controlling apparatus in machine tool having a position synchronizing instruction for and between the spindle and other subordinate axis has a switching means which switches between the normal spindle operation mode and the positionly synchronized operation mode wherein a spindle and subordinate axis are positionly synchronized, a compensating means for adding a difference between a feedback by the spindle and that by the subordinate axis to a position instruction issued to the subordinate axis only in the positionly synchronized mode, and a setting means for setting a position loop gain for the subordinate axis to the same value as that for the spindle.

In a machine tool controlling method according to the furthermore different embodiment of the present invention described above to control a speed or a position of a spindle or a subordinate axis by issuing a speed instruction or a position instruction to a machine tool controlling apparatus having a position synchronizing function for and between the spindle and the subordinate axis, whether the current operation is in the normal operation mode of the spindle or in the positionly synchronized operation mode in which the spindle and the subordinate axis are positionly synchronized is determined, and if it is determined that the current operation is in the positionly synchronized operation mode, a difference between position feedback by the spindle and the position feedback by the subordinate axis is added to a position instruction issued to the subordinate axis, and at the same time a position loop gain for the subordinate axis is set to the same value as that for the spindle.

A machine tool controlling apparatus according to another different embodiment of the present invention controlling a speed and a position of a spindle and subordinate axis by issuing a speed instruction or a position speed to a controlling apparatus in machine tool having a position synchronizing instruction for and between the spindle and other subordinate axis has a switching means which switches between the normal spindle operation mode and the positionly synchronized operation mode wherein a spindle and subordinate axis are positionly synchronized, a filter means for applying transfer function models for a spindle and a subordinate axis into a position instruction issued with the aforesaid switching means only in the positionly synchronized operation mode, and a compensating means for adding a difference between a feedback by the spindle and that by the subordinate axis to a position instruction issued from the aforesaid filter means.

In a machine tool controlling method according to the another different embodiment of the present invention described above to control a speed or a position of a spindle or a subordinate axis by issuing a speed instruction or a position instruction to a machine tool controlling apparatus having a position synchronizing function for and between the spindle and the subordinate axis, whether the current operation is in the normal operation mode of the spindle or in the positionly synchronized operation mode in which the spindle and the subordinate axis are positionly synchronized is determined, and if it is determined that the current operation is in the positionly synchronized operation mode, transfer function models for the spindle and the subordinate axis are extrapolated to a position instruction issued to the subordinate axis, and at the same time a difference between the position feedback by the spindle and the position feedback by the subordinate axis feedback is added to the position instruction.

In a machine tool controlling apparatus and an controlling method according to the present invention, whether the current operation is in the normal operation mode of a spindle or in the positionly synchronized operation mode in which a spindle and a subordinate axis are positionly synchronized, and if it is determined that the current operation is in the positionly synchronized operation mode, transfer function models for the spindle and the subordinate axis are extrapolated into a position instruction issued to the subordinate axis.

In a machine tool controlling apparatus and an controlling method according to another embodiment of the present invention, whether the current operation is in the normal operation mode of a spindle or in the positionly synchronized operation mode in which a spindle and a subordinate axis are positionly synchronized, and if it is determined that the current operation is in the positionly synchronized operation mode, transfer function models for the spindle and the subordinate axis are applied into a position instruction issued to the subordinate axis, and at the same time a difference between output from a transfer function model for a spindle and a position feedback by the spindle is added to a position instruction issued to the subordinate axis.

In a machine tool controlling apparatus and an controlling method according to a different embodiment of the present invention, whether the current operation is in the normal operation mode of a spindle or in the positionly synchronized operation mode in which a spindle and a subordinate axis are positionly synchronized, and if it is determined that the current operation is in the positionly synchronized operation mode, a difference between output from a transfer function model for a spindle and a position feedback by the spindle is added to a position instruction issued to the subordinate axis, and at the same time a position loop gain for the subordinate axis is set to the same value as that for the spindle.

In a machine tool controlling apparatus and an controlling method according to a furthermore different embodiment of the present invention, whether the current operation is in the normal operation mode of a spindle or in the positionly synchronized operation mode in which a spindle and a subordinate axis are positionly synchronized, and if it is determined that the current operation is in the positionly synchronized operation mode, a difference between a position feedback by a spindle and that by a subordinate axis is added to a position instruction issued to the subordinate axis, and at the same time a position loop gain for the subordinate axis is set to the same value as that for the spindle.

In a machine tool controlling apparatus and an controlling method according to another embodiment of the present invention, whether the current operation is in the normal operation mode of a spindle or in the positionly synchronized operation mode in which a spindle and a subordinate axis are positionly synchronized, and if it is determined that the current operation is in the positionly synchronized operation mode, transfer functions models for a spindle and a subordinate axis are applied into a position instruction issued to the subordinate axis, and at the same time a difference between a position feedback the spindle and that the subordinate axis is added to the position instruction.

In a machine tool controlling apparatus as well as in a machine tool controlling method according to the present invention, at first whether the current operation is in the normal spindle operation or in the positionly synchronized operation mode in which synchronism between a spindle and a subordinate axis is maintained, and if it is determined that the current operation is in the positionly synchronized operation mode, transfer function models for the spindle and the subordinate axis are applied to a position instruction issued to the subordinate axis, so that the tapping precision can be improved and the tapping cycle time can be reduced, thus the productivity being raised.

Also whether the current operation is in the normal spindle operation mode or in the positionly synchronized operation mode in which a synchronism between a spindle and a subordinate axis is determined, and if it is determined that the current operation is in the positionly synchronized operation mode, transfer function models for the spindle and the subordinate axis are applied to a position instruction issued to the subordinate axis. Also a difference between output from a transfer function model for a spindle and a position feedback by the spindle is added to the position instruction, so that the tapping precision can be raised and the tapping cycle time can be reduced, thus the productivity being raised.

Also, whether the current operation is in the normal spindle operation mode or in the positionly synchronized operation mode in which a synchronism between a spindle and a subordinate axis is required is determined. If it is determined that the current operation is in the positionly synchronized operation mode, a difference between output from the transfer function model for the spindle and a position feedback by the spindle is added to a position instruction issued to the subordinate axis, Also a position loop gain for a spindle can be set to the same value as that for a subordinate axis, so that the tapping precision can be raised and the tapping cycle time can be reduced, thus the productivity being raised.

Further, whether the current operation is in the normal spindle operation mode or in the positionly synchronized operation mode in which a synchronism between a spindle and a subordinate axis is determined. If it is determined that the current operation is in the positionly synchronized operation mode, a difference between a position feedback by a spindle and that by a subordinate axis is added to the position instruction issued to the subordinate axis, and at the same time, a position loop gain for the subordinate axis is set to the same value as that for the spindle. As a result, the tapping precision can be raised and the tapping cycle time can be reduced, thus increasing productivity.

Also whether the current operation is in the normal spindle operation or in the positionly synchronized operation is determined first. If it is determined that the current operation is in the positionly synchronized operation, transfer function models for a spindle and a subordinate axis are applied to a position instruction issued to the subordinate axis and also a difference between a position feedback by a spindle and that by a subordinate axis is added to the position instruction. As a result, the tapping precision can be raised and the tapping cycle time can be reduced, thus the productivity being raised.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A machine tool controlling apparatus comprising:
   a controller for controlling a position of a first axis and a second axis in response to position commands for each axis by outputting position instructions for each axis to a machine tool having a position synchronizing function between said first axis and said second axis, each axis having respectively different speed loop responses; and
   a filter for applying a transfer function model, that is based upon a position loop gain for each of said first axis and said second axis, to said second axis position command and for generating a position instruction outputted to said second axis in a position synchronous operation mode in which there is synchronism between said first axis and said second axis.

2. A machine tool controlling apparatus as set forth in claim 1 wherein said transfer function model has the form $$\frac{1 + \frac{1}{Kpz} \cdot \frac{1}{S}}{1 + \frac{1}{KpS} \cdot \frac{1}{S}}$$

where Kps is a spindle position loop gain and Kpz is a Z axis position loop gain.

3. A machine tool controlling apparatus as set forth in claim 1 wherein said first axis comprises a spindle axis.

4. A machine tool controlling method for controlling a position of a first axis and a second axis in response to position commands for each axis by outputting position instructions for each axis to a machine tool having a position synchronizing function between said first axis and said second axis, each axis having respectively different speed loop responses, comprising the steps of:
   making a determination as to whether current operation is in a normal operation mode of said first axis or in a position synchronous operation mode in which synchronism between said first axis and said second axis is made; and
   applying a transfer function model that is based on a position loop gain for each of said first axis and said second axis to said position command for said second axis and applying resulting position instruction to said second axis if it is determined that said current operation is in said position synchronous operation mode.

5. A machine tool controlling method as set forth in claim 4 wherein said transfer function model has the form $$\frac{1 + \frac{1}{Kpz} \cdot \frac{1}{S}}{1 + \frac{1}{Kps} \cdot \frac{1}{S}}$$

where Kps is a spindle position loop gain and Kpz is a Z axis position loop gain.

6. A machine tool controlling method as set forth in claim 4 wherein said first axis comprises a spindle axis.

7. A machine tool controlling apparatus comprising:
   a controller for controlling a position of a first axis and a second axis in response to position commands for each axis by outputting first and second position instructions for each axis, respectively, to a machine tool having a position synchronizing function between said first axis and said second axis, each axis having respectively different speed loop responses;
   a first filter for applying a first transfer function model, that is based on a position loop gain for each of said first axis and said second axis, to a position command for said second axis and for generating a first position instruction outputted to said second axis in a position synchronous operation mode in which there is synchronism between said first axis and said second axis;
   a second filter for applying a second transfer function model, that is based on the position loop gain for said first axis, to said second axis position command and for generating a second position instruction outputted to said second axis in said position synchronous operation mode; and a compensating means for adding a difference between the second position instruction output from said second filter and a position feedback of said first axis to said position instruction outputted from said first filter.

8. A machine tool controlling apparatus as set forth in claim 7 wherein said first transfer function model has the form $$\frac{1+\frac{1}{Kpz}\cdot\frac{1}{S}}{1+\frac{1}{Kps}\cdot\frac{1}{S}}$$

where Kps is a spindle position loop gain, and Kpz is a Z axis position loop gain and wherein said second transfer function has the form $$\frac{1}{1+\frac{1}{Kps}\cdot\frac{1}{S}}$$

wherein even if the values Kpz and Kps are different the position orbits for said spindle and X axis are the same.

9. A machine tool controlling apparatus as set forth in claim 7 wherein first axis comprises a spindle axis.

10. A machine tool controlling method for controlling a position of a first axis and a second axis in response to position commands for each axis by outputting position instructions for each axis to a machine tool having a position synchronizing function between said first axis and said second axis, each axis having respectively different speed loop responses, comprising the steps of:

making a determination as to whether the current operation is in the normal operation mode of said first axis or in the position synchronous operation mode in which synchronism between said first axis and said second axis is made;

applying a first transfer function model, that based on the position loop gains for said first axis and said second axis, to said position command for said second axis and generating a first position instruction if it is determined that said current operation is in said position synchronous operation mode;

applying a second transfer function model, that is based on the position loop gain for said first axis, to said position command for said second axis and generating a second position instruction if it is determined that said current operation is in said position synchronous mode;

adding a difference between said second position instruction output from said second transfer function model and a position feedback by said first axis to said first position instruction; and applying the result of said adding step to said second axis.

11. A machine tool controlling method as set forth in claim 10 wherein said first transfer function has the form $$\frac{1+\frac{1}{Kpz}\cdot\frac{1}{S}}{1+\frac{1}{Kps}\cdot\frac{1}{S}}$$

where Kps is a spindle position loop gain, and Kpz is a Z axis position loop gain and wherein said second transfer function model has the form $$\frac{1}{1+\frac{1}{Kps}\cdot\frac{1}{S}}$$

wherein even if the values Kpz and Kps are different the position orbits for said spindle and Z axis are the same.

12. A machine tool controlling method as set forth in claim 10 wherein said first axis comprises a spindle axis.

13. A machine tool controlling apparatus comprising:

a controller for controlling a position of a first axis and a second axis in response to position commands for each axis by outputting position instructions for each axis to a machine tool having a position synchronizing function between said first axis and said second axis, each axis having respectively different speed loop responses;

a filter for applying a transfer function model, that is based on the position loop gains for said first axis, to said second axis position command and for generating a position instruction outputted to said second axis in a position synchronous operation mode in which there is synchronous between said first axis and said second axis;

a compensating means for adding a difference between the position instruction output from said filter transfer function model and the feedback of a position instruction for said first axis, and said position instruction of said second axis; and a setting means for setting a position loop gain for said second axis to the same value as the position loop gain for said first axis.

14. A machine tool controlling apparatus as set forth in claim 13 wherein said first function has the form $$\frac{1}{1+\frac{1}{Kps}\cdot\frac{1}{S}}$$

where Kps is a spindle loop gain.

15. A machine tool controlling apparatus as set forth in claim 14 wherein said second axis comprises means for switchably connecting one of a first axis gain and a second axis gain.

16. A machine tool controlling apparatus as set forth in claim 13 wherein said first axis comprises a spindle axis.

17. A machine tool controlling method for controlling a position of a first axis and a second axis in response to position commands for each axis by outputting position instructions for each axis to a machine tool having a position synchronizing function between said first axis and said second axis, each axis having respectively different speed loop responses, comprising the steps of:

making a determination as to whether the current operation is in the normal operation mode of said first axis or in the position synchronous operation mode in which synchronism between said first axis and said second axis is made;

applying a transfer function model, that is based on the position loop gain of said first axis, to said position command for said second axis and generating a position instruction if it is determined that said current operation is in the position synchronous operation mode;

adding a difference between the position instruction output from said first transfer function model and a position feedback by said first axis to said position instruction if it is determined that said current operation is in said position synchronous operation mode; and setting a position loop gain for said second axis to the same value as that for said first axis.

18. A machine tool controlling method as set forth in claim 17 wherein said first function has the form $$\frac{1}{1+\frac{1}{Kps}\cdot\frac{1}{S}}$$

where Kps is a spindle position loop gain.

19. A machine tool controlling method as set forth in claim 18 further comprising switchably connecting between one of a first axis gain and a second axis gain in said second axis.

20. A machine tool controlling method as set forth in claim 17 wherein said first axis comprises a spindle axis.

21. A machine tool controlling apparatus comprising:
- a controller for controlling a position of a first axis and a second axis by outputting a position instruction to a machine tool having a position synchronizing function between said first axis and said second axis, each axis having respectively different speed loop responses;
- a compensating means for adding a difference between a position feedback from said first axis and a position feedback from said second axis to a position instruction outputted to said second axis in said position synchronous operation mode in which there is synchronism between said first axis and said second axis;
- a setting means for setting a position loop gain for said second axis to the same value as that for said first axis.

22. A machine tool controlling apparatus as set forth in claim 21 wherein said first axis comprises a spindle axis.

23. A machine tool controlling method for controlling a position of a first axis and a second axis by outputting a position instruction to a machine tool having a position synchronizing function between said first axis and said second axis, each axis having respectively different speed loop responses, comprising the steps of:
- making a determination as to whether the current operation is in the normal operation mode of said first axis or in the position synchronous operation mode in which there is synchronism between said first axis and said second axis;
- adding a difference between a position feedback from said first axis and a position feedback from said second axis to a position instruction outputted to said second axis if it is determined that said current operation is in said position synchronous operation mode; and
- setting a position loop gain for said second axis to the same value as that for said first axis.

24. A machine tool controlling method as set forth in claim 23 wherein said first axis comprises a spindle axis.

25. A machine tool controlling apparatus comprising:
- a controller for controlling a position of a first axis and a second axis in response to position commands for each axis by outputting position instructions for each axis to a machine tool having a position synchronizing function between said first axis and said second axis, each axis having respectively different speed loop responses;
- a filter for applying a transfer function model, that is based upon the position loop gain for at least one of said first axis and said second axis, to said second axis position command, said transfer function model being based on at least said second axis position loop gain during a position synchronous operation mode, and for generating a position instruction outputted to said second axis in a position synchronous operation mode in which there is synchronism between said first axis and said second axis; and
- a compensation means for adding a difference between a position feedback from said first axis and a position feedback from said second axis to said position instruction outputted from said filter.

26. A machine tool controlling apparatus as set forth in claim 25 wherein said transfer function model has the form $$\frac{1+\frac{1}{Kpz}\cdot\frac{1}{S}}{1+\frac{1}{Kps}\cdot\frac{1}{S}}$$

where Kps is a spindle position loop gain and Kpz is a Z axis position loop gain.

27. A machine tool controlling apparatus as set forth in claim 25 wherein said first axis comprises a spindle axis.

28. A machine tool controlling method for controlling a position of a first axis and a second axis in response to position commands for each axis by outputting position instruction for each axis to a machine tool having a position synchronizing function between said first axis and said second axis, each axis having respectively different speed loop responses, comprising the steps of:
- making a determination as to whether the current operation is in the normal operation mode of said first axis or in the position synchronous operation mode in which synchronism between said first axis and said second axis is made;
- applying a transfer function mode, that is based on the position loop gain for at least one of said first axis and said second axis, to said position command for said second axis, said transfer function model being based on at least said second axis position loop gain during a position synchronous operation mode, and for applying the resulting position instruction to said second axis if it is determined that said current operation is in said position synchronous operation mode; and
- adding a difference between a position feedback from said first axis and a position feedback from said second axis to said position instruction applied to said second axis.

29. A machine tool controlling method as set forth in claim 28 wherein said transfer function model has the form $$\frac{1+\frac{1}{Kpz}\cdot\frac{1}{S}}{1+\frac{1}{Kps}\cdot\frac{1}{S}}$$

where Kps is a spindle position loop gain and Kpz is a Z axis position loop gain.

30. A machine tool controlling method as set forth in claim 28 wherein said first axis comprises a spindle axis.

* * * * *